(12) United States Patent
Huang et al.

(10) Patent No.: US 12,304,821 B2
(45) Date of Patent: May 20, 2025

(54) ADDITIVE-FREE CARBON PARTICLE DISPERSIONS, PASTES, GELS AND DOUGHS

(71) Applicant: Northwestern University, Evanston, IL (US)

(72) Inventors: Jiaxing Huang, Wilmette, IL (US); Kevin Chiou, Chicago, IL (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 18/522,984

(22) Filed: Nov. 29, 2023

(65) Prior Publication Data

US 2024/0166520 A1    May 23, 2024

Related U.S. Application Data

(60) Division of application No. 16/798,829, filed on Feb. 24, 2020, now Pat. No. 11,873,223, which is a continuation-in-part of application No. PCT/US2018/047431, filed on Aug. 22, 2018.

(60) Provisional application No. 62/670,150, filed on May 11, 2018, provisional application No. 62/549,634, filed on Aug. 24, 2017.

(51) Int. Cl.
| | |
|---|---|
| C01B 32/174 | (2017.01) |
| B33Y 70/00 | (2020.01) |
| B82Y 30/00 | (2011.01) |
| C09D 1/00 | (2006.01) |
| C09D 7/20 | (2018.01) |
| C09D 7/40 | (2018.01) |
| D01F 9/12 | (2006.01) |

(Continued)

(52) U.S. Cl.
CPC .......... *C01B 32/174* (2017.08); *B33Y 70/00* (2014.12); *B82Y 30/00* (2013.01); *C09D 1/00* (2013.01); *C09D 7/20* (2018.01); *C09D 7/70* (2018.01); *D01F 9/12* (2013.01); *H01B 1/04* (2013.01); *H01B 1/24* (2013.01); *C01B 2202/06* (2013.01); *C01P 2006/22* (2013.01)

(58) Field of Classification Search
CPC ..... C01B 32/174; C01B 2202/06; C09D 1/00; C09D 7/20; C09D 7/70; C09D 7/61; B33Y 70/00; C08K 3/041; C08K 3/22; D01F 9/12; C08L 33/12
USPC .............................. 252/510, 511; 423/445 R
See application file for complete search history.

(56) References Cited

U.S. PATENT DOCUMENTS

| | | | | |
|---|---|---|---|---|
| 2013/0183511 | A1* | 7/2013 | Dai | B01J 20/3078 |
| | | | | 252/502 |
| 2018/0251377 | A1* | 9/2018 | Derby | C01B 21/0648 |

FOREIGN PATENT DOCUMENTS

| | | | | |
|---|---|---|---|---|
| CN | 108341961 A | * | 7/2018 | ........... C08G 77/392 |
| JP | 2013177295 A | * | 9/2013 | |
| KR | 20130081448 A | * | 7/2013 | |

OTHER PUBLICATIONS

Weng. CN-108341961-A, machine translation 2018 (Year: 2018).*
Translation of JP2013177295 (Year: 2013).*

* cited by examiner

*Primary Examiner* — Tri V Nguyen
(74) *Attorney, Agent, or Firm* — Bell & Manning, LLC

(57) ABSTRACT

Compositions of carbon particles dispersed in phenolic solvents or dispersed in solvent mixtures of one or more phenolic solvents with one or more non-phenolic solvents are provided. The compositions can take the form of liquid dispersions, pastes, gels, and doughs. Also provided are (Continued)

methods of making the compositions and methods of forming the compositions into coatings, films, fibers, and other three-dimensional objects.

20 Claims, 27 Drawing Sheets

(51) Int. Cl.
*H01B 1/04* (2006.01)
*H01B 1/24* (2006.01)

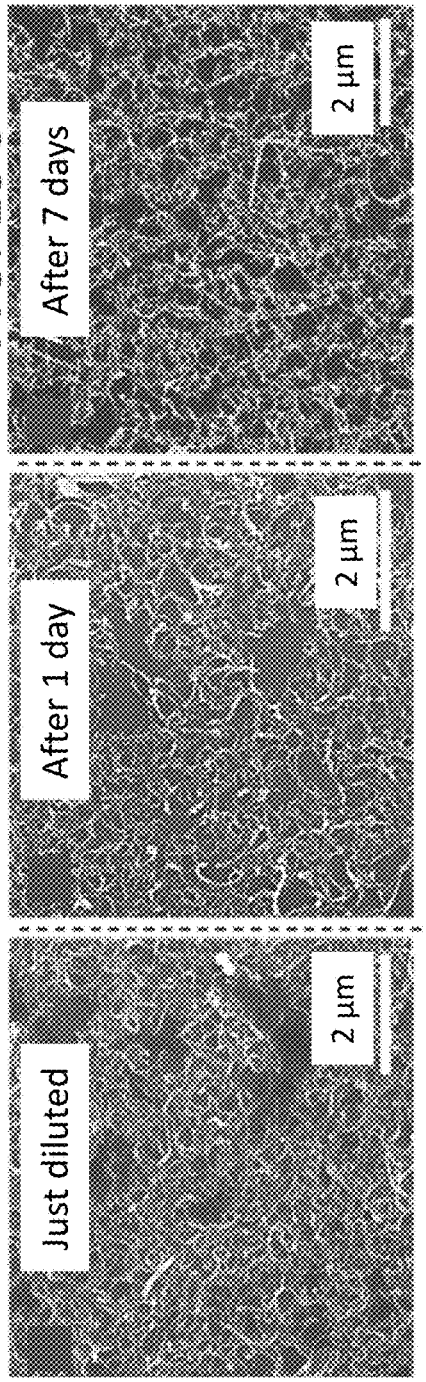
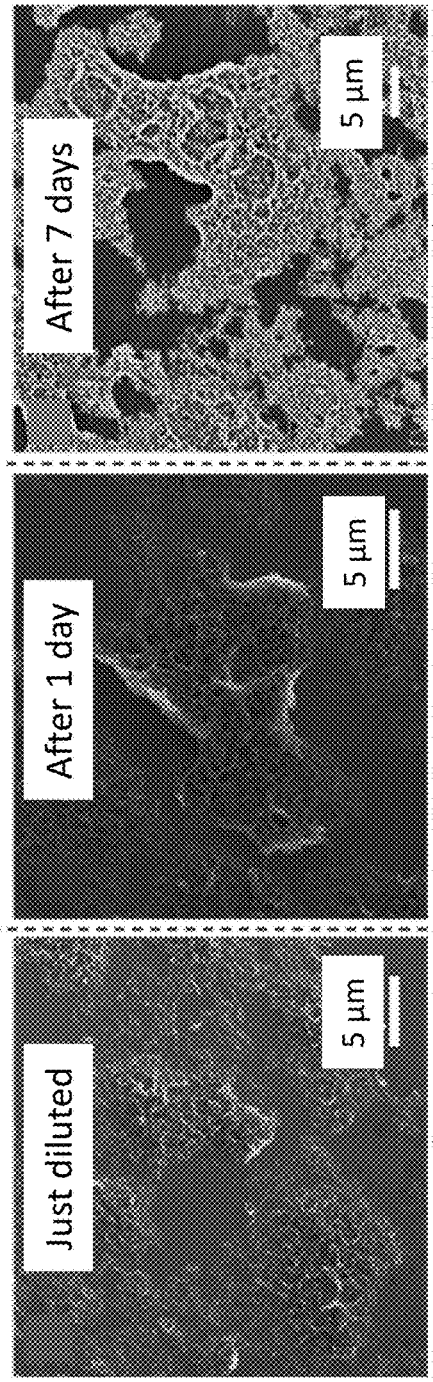

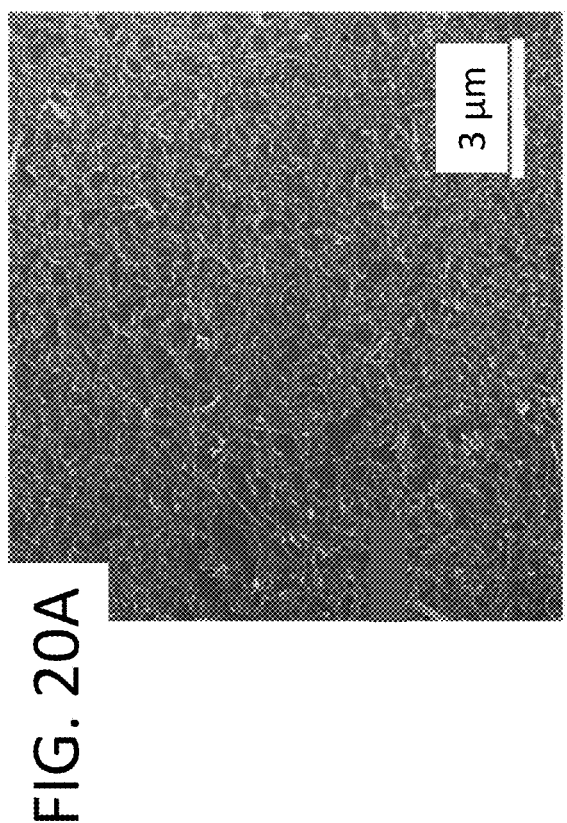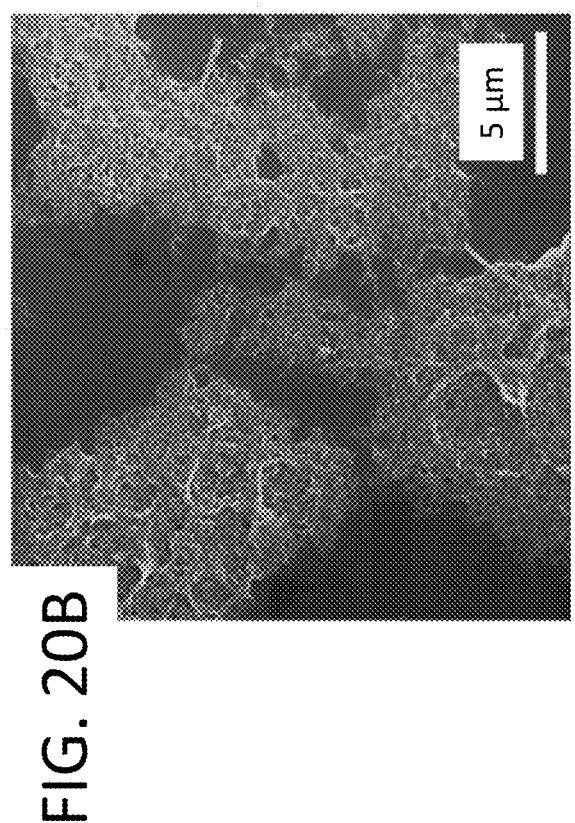

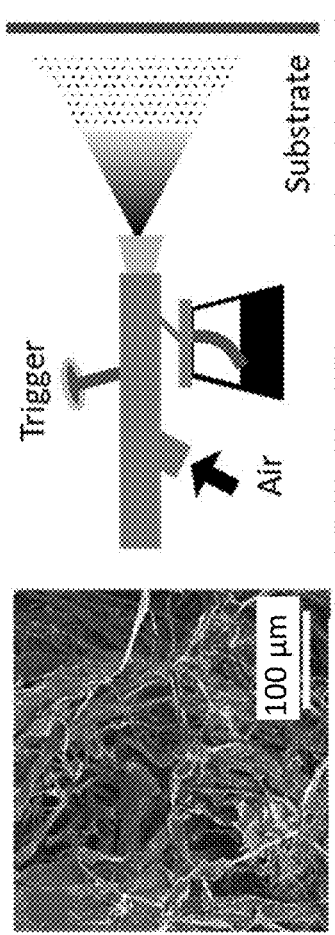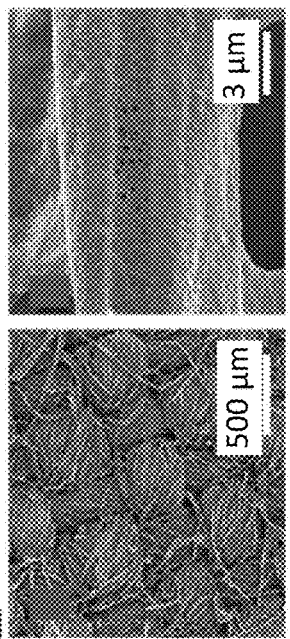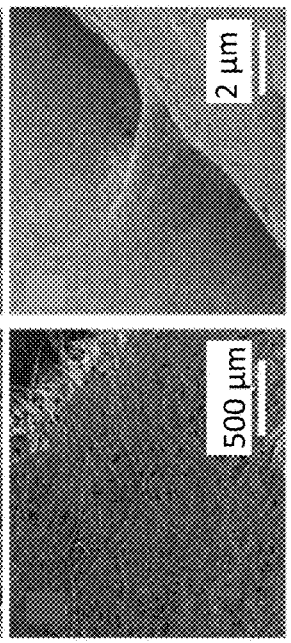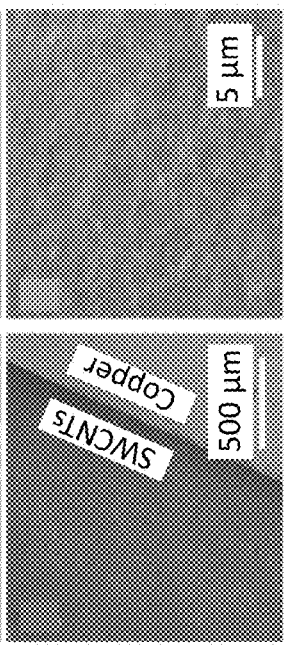
FIG. 21A  FIG. 21B  FIG. 21C  FIG. 21D  FIG. 21E  FIG. 21F  FIG. 21G  FIG. 21H

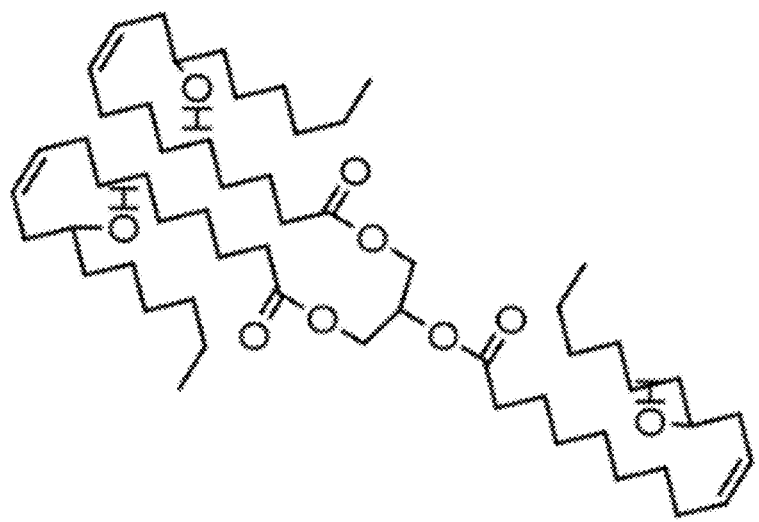
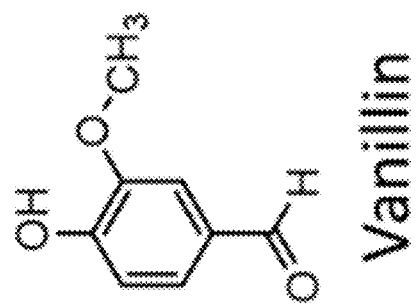
FIG. 23

ADDITIVE-FREE CARBON PARTICLE DISPERSIONS, PASTES, GELS AND DOUGHS

CROSS-REFERENCE TO RELATED APPLICATIONS

The present application is a divisional application of U.S. patent application Ser. No. 16/798,829 filed Feb. 24, 2020, which claims priority as a continuation-in-part of International Application number PCT/US2018/047431 filed on Aug. 22, 2018, which claims priority to U.S. provisional patent application No. 62/549,634 filed Aug. 24, 2017 and to U.S. provisional patent application No. 62/670,150 filed May 11, 2018. The entire contents of each of these priority applications are incorporated herein by reference.

BACKGROUND

Carbon nanotubes have been found attractive for a number of applications due to their excellent electrical, thermal, and mechanical properties. In recent years, there has been significant progress in the production of carbon nanotubes. Some types of nanotubes are already mass-manufactured in the ton scale, usually in the form of powders, which must be further processed for applications. During processing, powder materials are often used with solvents, in the forms of dispersions, pastes, gels, or doughs, so that they can be made into the desirable geometries and structures. (See, M. E. Fayed, et al., Springer, Boston, ed. 2nd, 1997.) To make carbon nanotubes solution processable, their surfaces usually need to be modified to make them dispersible in solvents, which tend to irreversibly alter their surface properties or introduce hard-to-remove additives. Some types of solvents have been discovered that can produce relatively high concentration dispersions of carbon nanotubes, such as super acids, ionic liquids, and N-cyclohexyl-2-pyrrolidnone. (See, V. A. Davis et al., *Nat. Nanotechnol.* 4, 830-834 (2009); T. Fukushima, et al., *Chemistry—A European Journal* 13, 5048-5058 (2007); S. D. Bergin et al., *ACS Nano* 3, 2340-2350 (2009).) However, most common solvents for nanotubes, such as N-methyl-2-pyrrolidone (NMP), N,N-dimethylformamide (DMF), and 1, 2-dichrolobenzene, can only directly disperse some types of nanotubes at very low concentrations. (See, C. A. Furtado et al., *J. Am. Chem. Soc.* 126, 6095-6105 (2004); J. L. Bahr, et al., *Chem. Commun.* 0, 193-194 (2001).)

SUMMARY

Compositions of carbon particles, such as carbon nanoparticles, in phenolic solvents are provided. Also provided are methods of making the compositions and methods of forming the compositions into carbon particle-containing films, fibers, and other three-dimensional objects.

One embodiment of a composition includes carbon nanoparticles dispersed in an organic solvent comprising one or more phenol group-containing molecules, wherein the concentration of carbon nanoparticles in the organic solvent is at least 3 mg/ml.

One embodiment of a method of making a solid object from a composition that includes carbon nanoparticles dispersed in an organic solvent comprising one or more phenol group-containing molecules, wherein the concentration of carbon nanoparticles in the organic solvent is at least 3 mg/ml, includes forming the composition into a planar layer or a non-planar shape and removing the organic solvent from the composition to form a solid object, such as a coating, a film, or a three-dimensional object.

BRIEF DESCRIPTION OF THE DRAWINGS

Illustrative embodiments of the invention will hereafter be described with reference to the accompanying drawings, wherein like numerals denote like elements.

FIGS. 19A-19F show SEM images of LB films of MWCNTs obtained from their dispersion in 20/80 solvent mixture of (FIGS. 19A-19C) m-cresol/toluene and (FIGS. 19D-19F) m-cresol/acetone after different storage time. The dispersion in m-cresol/toluene consistently produced continuous, uniform near-monolayer films of MWCNTs. In contrast, the dispersion in m-cresol/acetone always led to inhomogeneous LB films made of mainly clumps of aggregated nanotubes.

FIGS. 20A-20B show that after 2 months, gentle shaking by hand was able to re-disperse MWCNTs in m-cresol/toluene to produce (FIG. 20A) a uniform LB film as shown in the SEM image. Sediment in m-cresol/acetone cannot be re-dispersed and still contains (FIG. 20B) clumps of aggregated nanotubes.

FIGS. 21A-21H show (FIG. 21A) a SEM image showing that powders of SWCNTs are largely made of bundled and aggregated nanotubes with diameters of microns to tens of microns, which can be dispersed well in an m-cresol/toluene mixture to yield a homogenous SWCNT ink suitable for (FIG. 21B) air brushing to coat various substrates such as (FIGS. 21C and 21D) cotton cloth, (FIGS. 21E and 21F) paper, and (FIGS. 21G and 21H) copper foil. Low magnification SEM images show that air brushing produced a continuous thin film, evenly coating the substrate and replicating the morphology of the substrate. Under higher magnification, SEM images show that the coating bridges neighboring textile fibers on cloth and paper. The nanotube network on copper foil is smooth and uniform. All of the coatings are conformal and adhere to their substrates well.

FIG. 23: A mixture of 20 wt. % vanillin with 80 wt. % castor oil is a pale transparent liquid. Adding excessive amount of vanillin leads to its crystallization. MWCNTs can be directly dispersed in this oil mixture (up to at least 1 mg/ml). The well dispersed MWCNTs also suppresses the crystallization of vanillin.

DETAILED DESCRIPTION

Figure 1:
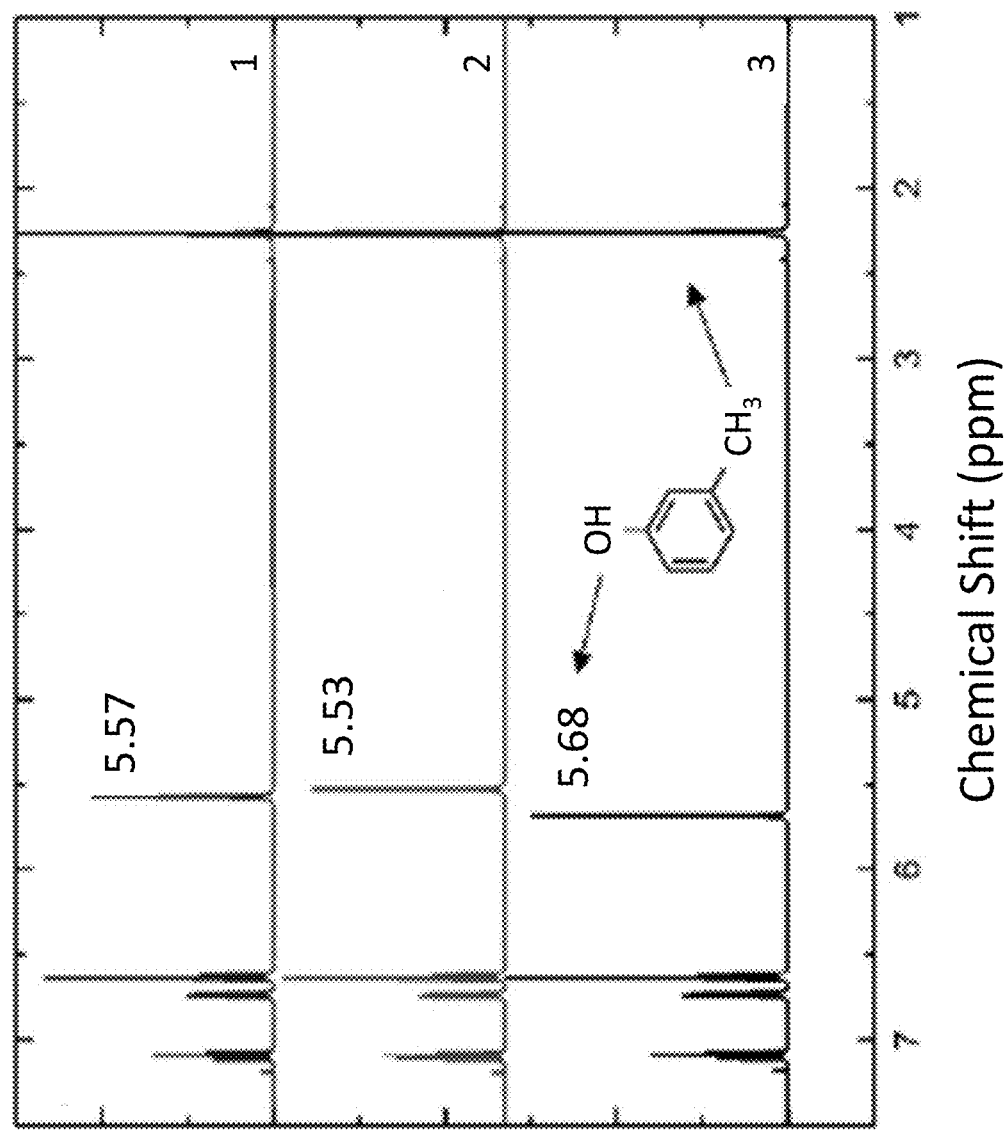
FIG. 1 depicts proton nuclear magnetic resonance ($^1$H-NMR) spectra showing a hydroxyl proton of m-cresol shifted upfield in the presence of either single-walled carbon nanotubes (SWCNTs) (1, top trace) or multi-walled carbon nanotubes (MWCNTs) (2, middle trace). The carbon nanotube (CNT) samples for nuclear magnetic resonance (NMR) were uniformly dispersed.

Compositions of carbon particles, including conjugated carbon particles, such as carbon nanoparticles, in phenolic solvents, such as cresol solvents and phenol group-containing plant oils and phenol group-containing molecules extracted from plant oils, are provided. Also provided are methods of making the compositions and methods of forming the compositions into carbon particle-containing films, fibers, and other three-dimensional objects.

The phenolic solvents comprise solvent molecules that include a phenol group. In some embodiments of the compositions, cresols are the only solvent in the composition, while in other embodiments these phenolic solvents may be mixed together and/or mixed with additional phenolic and/or non-phenolic organic solvents to provide a phenolic solvent mixture. Depending upon the concentration of the carbon particles in the solvents, the compositions may take on the forms of a liquid dispersion, a paste, a gel, or a dough. The phenolic solvents, along with any other solvents present, can be removed from the compositions after processing. The use of cresols is advantageous because they do not alter the surface properties of the carbon particles. As such, the compositions offer versatile processability for bulk quantities of carbon particles without negatively altering their pristine properties. This makes compositions readily usable by existing and emerging materials processing techniques used in industry, including LB assembly, spin coating, drop casting, doctor blading, screen-printing, 3D printing, molding, and rolling to create desirable forms or composites for a wide array of applications.

The compositions include carbon particles (for example, carbon nanoparticles) dispersed in a solvent that includes one or more phenolic solvents. The phenolic solvents or phenolic solvent mixtures are desirably liquids at or near room temperature or at the temperature at which the compositions are to be used; for example, they may be liquids at temperatures in the range from about 20° C. to 30° C. In some embodiments of the compositions, the phenolic solvents are liquid at temperatures in the range from about 22° C. to about 26° C. Suitable phenolic solvents include such as cresols, phenol group-containing plant oils or phenol group-containing molecules extracted therefrom, and phenols functionalized with one or more organic groups on the phenol ring. Suitable organic groups include saturated and/or unsaturated long chain (e.g., C8 to C20) organic tails. The cresols, which are a group of methylphenols, include the isomers m-cresol, o-cresol, and p-cresol, and combinations of two of more thereof. Plant oils that contain phenols include tree nut oils and vanilla. Phenolic molecules that can be extracted from plant oils and used as solvents include anacadic acid, cardol, cardanol, vanillin, and mixtures of two or more thereof.

The carbon particles can include carbon nanotubes, carbon black particles, graphite particles, fullerenes, single sheet graphene particles (e.g., graphene flakes), graphene oxide (GO) particles, reduced graphene oxide (r-GO) particles (e.g., r-GO flakes), or a combination of two or more thereof. The above-referenced graphene-based particles (graphene, GO, r-GO) can include a single sheet of the graphene material or multiple sheets. The carbon nanoparticles are so called because they have at least one dimension (i.e., length, width, or height) that is 1000 nm or less; depending upon the shape of the nanoparticles, they may have two or three dimensions that are 1000 nm or less. Some embodiments of the nanoparticles have length, width, and/or height dimensions that are 500 nm or less, some have length, width and/or height dimensions that are 100 nm or less, and some have length, width, and/or height dimensions that are 10 nm or less. The carbon nanotubes can be single-walled carbon nanotubes (SWCNTs), multi-walled carbon nanotubes (MWCNTs) (i.e., nanotubes having an averaged number of walls great than 1), or a mixture thereof. The carbon nanotubes can be semiconducting, metallic, or a combination of semiconducting and metallic carbon nanotubes. The carbon nanotubes may have functional groups, such as carboxylic acid functionalities, attached to their surfaces, or they may be free of surface functionalities. Carbon nanotubes having a wide range of lengths can be dispersed in the cresols. The lengths of the carbon nanotubes that can be dispersed are not particularly limited. By way of illustration, carbon nanotubes having lengths in the range from 5 nm to 10,000 nm can be used. The diameters of the carbon nanotubes that can be dispersed are not particularly limited. By way of illustration, carbon nanotubes having diameters in the range from about 0.8 nm to 50 nm can be used.

Organic solvents that can be mixed with the phenolic solvents to form a solvent mixture include solvents that are miscible with the phenolic solvents and have a dielectric constant of 10 or lower, including those having a dielectric constant of 5 or lower. By way of illustration, organic solvents that can be mixed with the one or more cresols to form a cresol solvent mixture include solvents that are miscible with the cresols and have a dielectric constant of 10 or lower, including those having a dielectric constant of 5 or lower. In some embodiments, the organic solvents do not undergo hydrogen bonding. These include, for example, hexane, cyclohexane, chloroform, toluene, 1,4-dioxane, anisole, other saturated hydrocarbons and their isomers (for example, pentane, heptane, decane, dodecane), xylenes, styrenes, dichloromethane, 1,4-butadiene, and mixtures of two or more thereof. In the solvent mixtures, these miscible solvents may be the majority solvent, making up more than 50 vol. % of the solvent mixture, while the phenolic solvents (e.g., cresols) are the minority solvent. This includes embodiments of the solvent mixtures in which the additional organic solvents make up at least 70 vol. %, at least 90 vol. %, and at least 99 vol. % of the solvent mixture. In such embodiments, the phenolic solvents act as dispersing agents for the carbon particles in relatively dilute carbon nanoparticle dispersions. For example, these solvent mixtures can be used to form dispersions having a carbon nanoparticle concentration of less than 3 mg carbon nanoparticle/ml of organic solvent, less than 1 mg carbon nanoparticle/ml of organic solvent, less than 1 mg carbon nanoparticle/ml of organic solvent, or less than 0.5 mg carbon nanoparticle/ml of organic solvent.

For compositions that include one or more cresols as a solvent, other organic solvents that can be mixed with the one or more cresols and, if present, the other organic solvents recited immediately above, include other phenolic molecules (that is—molecules that have a phenol group), such as phenol bisphenols and bisphenol derivatives (e.g., bisphenol-A, bisphenol-S, bisphenol-AF, bisphenol-F, bisphenol-M, bisphenol B, bisphenol C), phloroglucinol, resorcinol, 4-chloro-3-methylphenol, biphenol, naphthol isomers, naphthlenediol isomers, naphthlenetriol isomers, xylenols, other halogenated phenols and isomers thereof (such as 4-bromophenol, 3,4-fluorophenol, and 4-iodophenol), and mixtures of two or more thereof. These phenolic solvents may also be present as the majority solvent (>50 vol. %) in the cresol solvent mixture. However, they can also be used at smaller concentrations. By way of illustration, some embodiments of the solvent mixtures contain less than 50 vol. % of the phenolic solvents, less than 30 vol. % of the phenolic solvents, less than 10 vol. % of the phenolic solvents, less than 1 vol. % of the phenolic solvents, or less than 0.1 vol. % of the phenolic solvents. Phenolic solvent—cresol solvent mixtures that become liquid upon mixing or that can be liquified by heating—can be used to form carbon nanoparticle dispersions, pastes, gels, and doughs by adjusting the cresol solvent mixture content of the composition. Other embodiments of the cresol solvent mixtures contain at least 50 vol. % of the phenolic solvents, at least 70 vol. % of the phenolic solvents, at least 90 vol. % of the phenolic solvents, or at least 99 vol. % of the phenolic solvents.

Some embodiments of the compositions are free of polymers, including polymer resins, organic monomers and oligomers that are precursors of organic polymers (i.e., molecules that react to form polymers), and initiators (e.g., free radical initiators, such as peroxides) that induce the polymerization and of precursors of organic polymers, the crosslinking of polymers in the composition, or the crosslinking of the carbon nanoparticles themselves. By way of illustration only, polymers, polymer resins, and precursors of polymers that have been used as binders in other carbon nanoparticle composites but may be excluded from the present compositions, include polyacrylates, polyamides, polyalkylene oxides, polyurethanes, epoxide polymers, cellulose, and their precursors. In addition, embodiments of the compositions may be free of any chemicals that act to increase the dispersibility of the carbon particles in the phenolic solvents, the phenolic solvent mixtures, and/or in water. Such chemicals include surfactant molecules and other dispersants. However, the compositions may contain other components, including components that are present as impurities in the starting materials. For example, some embodiments of the composition may include phenolic molecules that are present as impurities in some commercially available cresols. If the other components are present as impurities, they are typically present at small concentrations—typically 1 wt. % or less, including 0.1 wt. % or less. However, phenolic molecules need not be present only as impurities; they can be added in selected amounts to provide solvent mixture.

Some embodiments of the compositions contain only the carbon particles, cresols, miscible organic non-hydrogen bonding solvents, and/or other phenolic solvents. Some embodiments of the compositions contain only the carbon particles, cresols, and other phenolic solvents. Some embodiments of the compositions contain only the carbon particles and cresols.

In other embodiments of the compositions, chemical components other than carbon particles, cresols, miscible organic non-hydrogen bonding solvents, and other phenolic molecules can be present. By way of illustration only, in various embodiments of the compositions, these additional chemical components may account for up to 10 wt. % of the composition. This includes embodiment of the compositions in which these additional chemical components account for up to 5 wt. % of the composition, up to 2 wt. % of the composition, up to 1 wt. % of the composition, or up to 0.1 wt. % of the composition.

The compositions can be made by combining the carbon particles (e.g., for example, a carbon nanotube sample, which may include entangled and agglomerated carbon nanotubes), with the one of more phenolic solvents (e.g., cresols) of the solvent mixture followed by mixing. The degree and type of mixing will depend on the desired form of the composition. For example, a fine dispersion of carbon nanoparticles in the phenolic (e.g., cresol) solvents or solvent mixtures can be formed by mixing a carbon nanoparticle powder in the solvent using ultrasonication. Alternatively, thicker compositions, such as pastes, gels, and doughs, can be made by grinding a carbon nanoparticle powder in the phenolic solvents (e.g., cresols) or the phenolic solvent mixtures using, for example, a mortar and pestle.

Low viscosity, liquid dispersions of the carbon nanotubes can be formed by using relatively low concentrations of the carbon nanotubes. The dispersions may be characterized by low viscosities and low electrical conductivities, which reflect the lack of a percolating carbon nanotube network. For example, some embodiments of the carbon nanotube dispersions have a viscosity near that of one or more cresols (for example, differing from the viscosity of the cresols or cresol mixture by no more than a factor of 0.05, including by no more than a factor of 0.01) at 298K and a conductance of $10^{-4}$ S or lower. This includes carbon nanotube dispersions having a conductance of $10^{-5}$ S or lower. Typical carbon nanotube concentrations in the dispersions include concentrations in the range from near zero (>0; for example, about 0.01 or 0.1 mg/ml) up to about 3 mg/ml, although this range can vary depending on the types and morphologies of the carbon nanotubes being used. As used herein, mg/ml refers to the mg of carbon particles per ml of the solvent being used; thus, if the solvent contains only cresols, mg/ml refers to mg of carbon nanoparticles per ml of cresol. In some embodiments of the dispersions, the carbon nanotube concentration is less than 1 mg/ml. Dispersions of other carbon particles can also be formed, although the concentration ranges can vary depending on the types and morphologies of the carbon particles being used.

The carbon nanotube dispersions (or dispersions of other carbon nanoparticles) can be formed into thin films, including monolayer thin films. LB assembly is an example of a technique that can be used to make monolayer thin films, as illustrated in the Examples. The sheet resistance and optical transparency of the thin films can be fine-tuned by precisely controlling the number of deposited layers as well as the carbon particle packing density within each monolayer. For example, thin, optically transparent films of the carbon nanotubes having a sheet resistance of at least 70 kΩ/sq, including at least 90 kΩ/sq, and an optical transparency of at least 60%, including at least 70%, can be formed.

At higher concentrations, carbon nanotube pastes (or pastes of other carbon particles) can be formed. The transition from a dispersion to a paste can be characterized by a marked increase in the electrical conductivity of the composition, which can be attributed to the formation of a percolating carbon network. The pastes are also more viscous than the dispersions and can exhibit shear thinning behavior. For example, some embodiments of the carbon nanotube pastes have a viscosity in the range up to about 800 Pa*S 298K and a conductance of $10^{-3}$ S or higher. This includes carbon nanotube pastes having a conductance of $10^{-2}$ S or higher. Typical carbon nanotube concentrations in the pastes include concentrations in the range from about 3 mg/ml up to about 40 mg/ml, although this range can vary depending on the types and morphologies of the carbon nanotubes being used. Pastes of other carbon particles can also be formed, although the concentration ranges can vary depending on the types and morphologies of the carbon particles being used.

Coatings of the carbon nanotube pastes (or pastes of other carbon particles) can be applied to a surface via, for example, brushing, doctor blading, inkjet printing, or screen-printing. The coatings can then be heated to drive off the phenolic solvents and other solvents, leaving a film composed of a high-density network of nanoparticles. The coatings and films can be patterned or unpatterned (e.g., continuous). The pastes can also be made into polymer composites by mixing polymers into the pastes. Polymers that can be incorporated into the paste include poly(methyl methacrylate) (PMMA), nylons, polyethyelene terephthalate (PET), polystyrene, and phenolic resins. Other materials that can be incorporated into the pastes to form composite materials include metals and oxides, such as metal oxides and ceramics. The polymers and other materials can be incorporated into the pastes by pre-forming the paste and then combining the paste with the other particles by, for example, shear-mixing, co-grinding, and/or ball-milling. By way of illustration, a polymeric composite can be made by combining particles of a polymer (e.g., a polymer powder) with the paste to form a composite of the polymer and the paste. If the polymer is curable, the polymer in the paste can be cured to form a crosslinked polymeric matrix in which the carbon nanotubes (or other carbon particles) are dispersed. Alternatively, a polymeric composite can be formed by combining the paste with curable polymer precursors, such as organic monomers or oligomers, and then curing the precursors to form a polymeric matrix.

The polymer composites can be formed into films that can be rolled into flexible and highly plastic sheets, or made into other three-dimensional objects. Upon thermal curing, the sheets or objects can be hardened due to the removal of the phenolic solvents (e.g., cresols) and, if present, other solvents. The inclusion of carbon nanotubes in the polymers can provide an increased Young's modulus. The loading of carbon nanoparticles in the polymer composites and the hardened objects made therefrom can be varied based on their intended applications. By way of illustration, embodiments of the polymer composites and/or hardened objects can have a carbon nanotube loading from 0.2 wt. %, to at least 30 wt. %, based on the total weight of the carbon nanotubes and the polymer. Some embodiments of the hardened films made from the carbon nanotube pastes can sustain a tensile strain of 500% or more, including a tensile strain of 800% or more.

At still higher concentrations, carbon nanotube gels (or gels of other carbon particles) can be formed. The transition from a paste to a gel can be marked by a sharp increase in the viscosity of the composition. For example, some embodiments of the carbon nanotube gels have a viscosity of at least 1000 Pa*S at 298K. This includes carbon nanotube gels having a viscosity of at least 1200 Ps*S and at least 1400 Pa*S at 298 K. Typical carbon nanotube concentrations in the gels include concentrations in the range from about 40 mg/ml up to about 100 mg/ml, although this range can vary depending on the types and morphologies of the carbon nanotubes being used. Gels of other carbon particles can also be formed, although the concentration ranges can vary depending on the types and morphologies of the carbon particles being used. The gels are free-standing and can be extruded into self-supporting fibers, which maintain their shape after removing the solvents, to form stiff solid objects via 3D (i.e., extrusion) printing or extrusion.

At even higher concentrations, carbon nanotube doughs (or doughs of other carbon particles) can be formed. The transition from a gel to a dough is characterized by an increase in the compression modulus. The doughs are generally stiff, viscoelastic materials. For example, some embodiments of the carbon nanotube doughs have a stiffness of 0.125 kPa or higher. This includes carbon nanotube doughs having a stiffness of 0.15 or higher and 0.2 or higher. Typical carbon nanotube concentrations in the dough include concentrations in the range from about 100 mg/ml up to about 140 mg/ml—or even higher, although this range can vary depending on the types and morphologies of the carbon nanotubes being used. Doughs of other carbon particles can also be formed, although the concentrations range can vary depending on the types and morphologies of the carbon particles being used. The doughs are viscoelastic and highly cohesive. They can be kneaded or rolled, cut into pieces and recombined when pressed together, and/or molded into arbitrary shapes and objects. For example, the high carbon nanoparticle doughs can be used to fabricate pure carbon nanoparticle devices, sculpt irregular shapes, and form flexible thin films. By way of illustration, embodiments of the doughs can be placed into a mold and molded into macroscopic three-dimensional objects, including objects having length, width, and/or height dimensions of at least 1 mm, including one or more dimensions of at least 1 cm. Such components include, for example, electronic components or mechanical parts. The solvents can be removed from the doughs before or after the dough is released from the mold.

Unless otherwise indicated, quantitative values disclosed herein that are temperature and/or pressure dependent refer to those values as measured at room temperature (e.g., 23° C.) and atmospheric pressure (e.g., 1 atm).

Methods for measuring the viscosity, conductance, and stiffness (compression modulus) of the carbon nanoparticle compositions are provided in the Examples below.

EXAMPLES

Example 1

This example demonstrates the use of cresols as generic solvents for processing various kinds of carbon nanotubes, and further demonstrates that they can also be easily removed afterwards by washing or evaporation. Most strikingly, cresols can process carbon nanotubes over a very broad range of concentrations, reaching the level of tens of weight percent. As the concentration of carbon nanotubes increases, a continuous transition of four distinctive states—namely dilute dispersions, thick pastes, freestanding gels, and viscoelastic doughs—is observed, all of which are readily usable by a wide array of material processing techniques.

The results of the studies described in this Example demonstrate that powders of both SWCNTs and MWCNTs can be well dispersed in m-cresol after sonication or grinding without the need for any surface functionalization. As verified by SEM images, initially the nanotubes were heavily agglomerated and entangled in the powders, but they became well separated after casting from the corresponding m-cresol dispersions. These results indicate that the interaction between m-cresol and the surface of the carbon nanotubes must be sufficiently strong to allow the agglomerated nanotubes to disperse. $^1$H-NMR spectroscopy was employed to probe the nature of such interaction. As shown in FIG. 1, in the presence of SWCNTs and MWCNTs, the phenolic hydroxyl proton peak shifted upfield by 0.10 ppm, while other proton peaks remained unchanged. This shift was a result of increased electron density on the phenolic hydroxyl proton, indicating charge-transfer interaction with the nanotubes.

Figure 2:
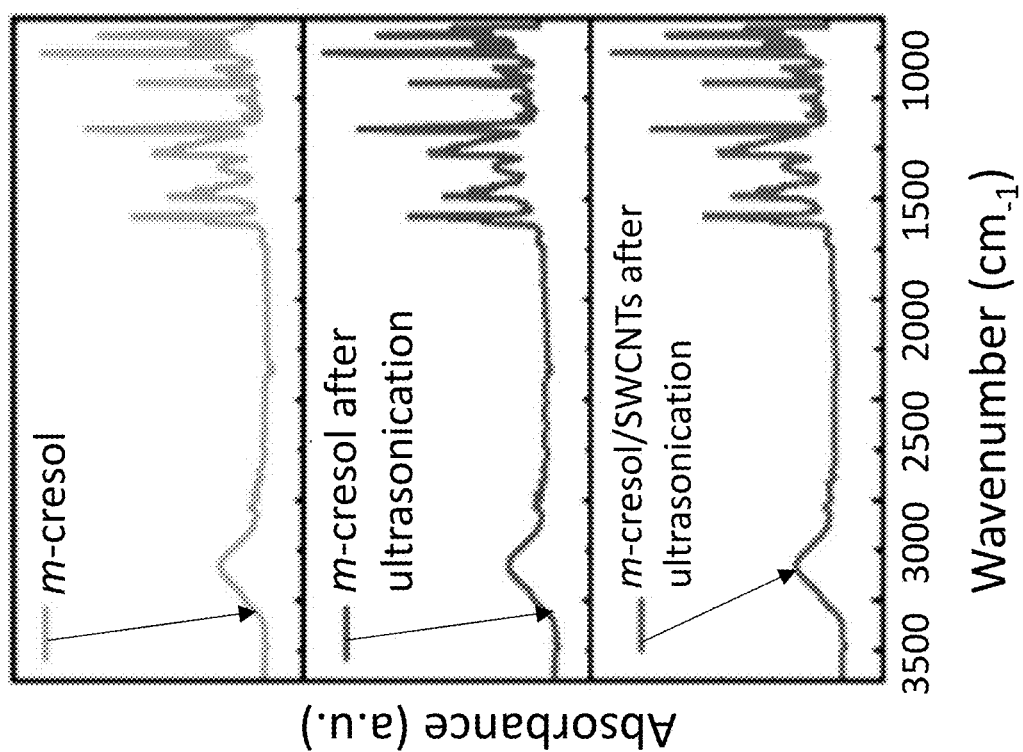
FIG. 2 depicts Fourier-transform infrared (FTIR) spectra showing that m-cresol does not degrade during ultrasonication with or without SWCNTs.
Figure 3:
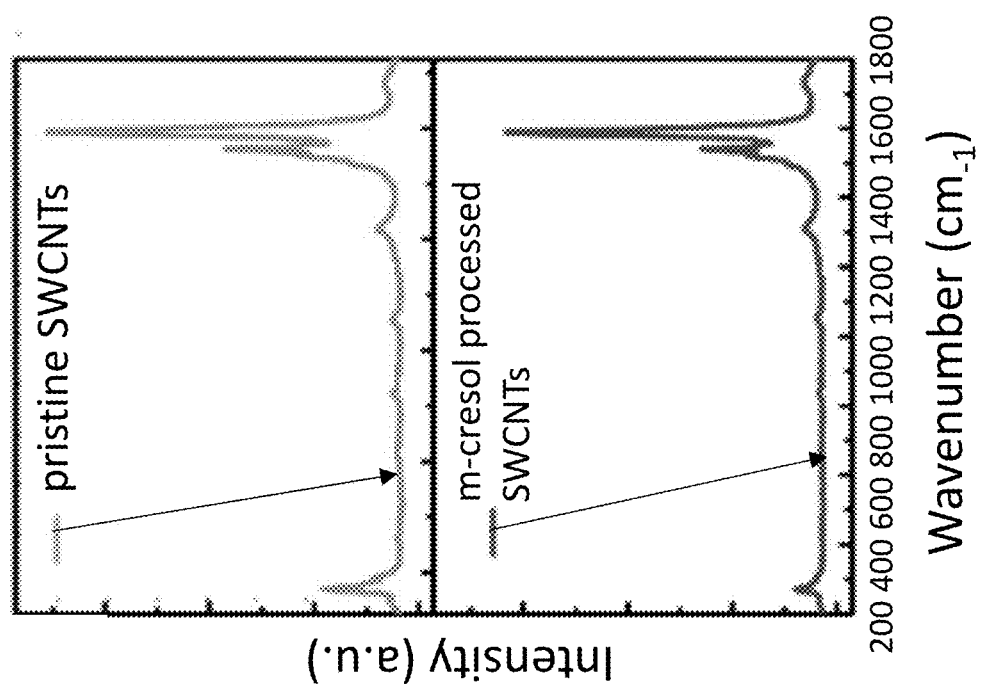
FIG. 3 shows no obvious change in the Raman spectra of pristine SWCNTs and those cast from m-cresol, suggesting that they were not damaged during sonication. The cast SWCNTs were dried and rinsed with water before taking Raman spectra.

Sonicating or grinding carbon nanotubes in m-cresol does not induce chemical changes to either the solvent or the nanotubes. This is illustrated with SWCNTs due to their higher spectroscopic sensitivity to structural changes. The FTIR spectra in FIG. 2 show that m-cresol itself does not degrade after ultrasonication with or without SWCNTs. As a relatively weak acid, m-cresol does not induce permanent chemical changes to the nanotube surface and can be removed by evaporation or washing. The Raman spectra of the pristine SWCNTs and a dried SWCNT film cast from m-cresol dispersion do not show obvious differences (FIG. 3), suggesting that the pristine SWCNTs are not damaged during processing. The absence of new bands between 400 to 1000 cm$^{-1}$, where m-cresol shows strong Raman signals, indicates that m-cresol have been successfully removed.

Among the three isomers of cresols, m-cresol is a liquid at room temperature; therefore, it is used for most of the experiments in this Example. While o-cresol and p-cresol are solid at room temperature, they can also process carbon nanotubes at a molten state or when blended with m-cresol at room temperature. This indicates that even the unrefined, crude grade of cresols, which is a liquid mixture of the three isomers, can be directly used for industrial scale processing of carbon nanotubes. Indeed, UV-Vis-NIR spectra of SWCNTs dispersed in a ternary isomer mixture of cresol show characteristic bands of well dispersed nanotubes, which is confirmed by transmission electron microscopy (TEM) studies. Industrial grade cresols often contain phenolic impurities, and it is found that adding an additional 10 wt. % of phenol into the ternary mixture would not negatively affect the stability of the nanotube dispersions. The impurity tolerance and ease of removal make cresols the ideal type of non-reactive solvents for the solution processing of carbon nanotubes. In the sections below, cresol solvents are demonstrated to render carbon nanotubes with polymer-like rheological and viscoelastic properties and processability, making them immediately usable by already available material processing techniques to create desirable structures, form factors, and composites.

Figure 4:
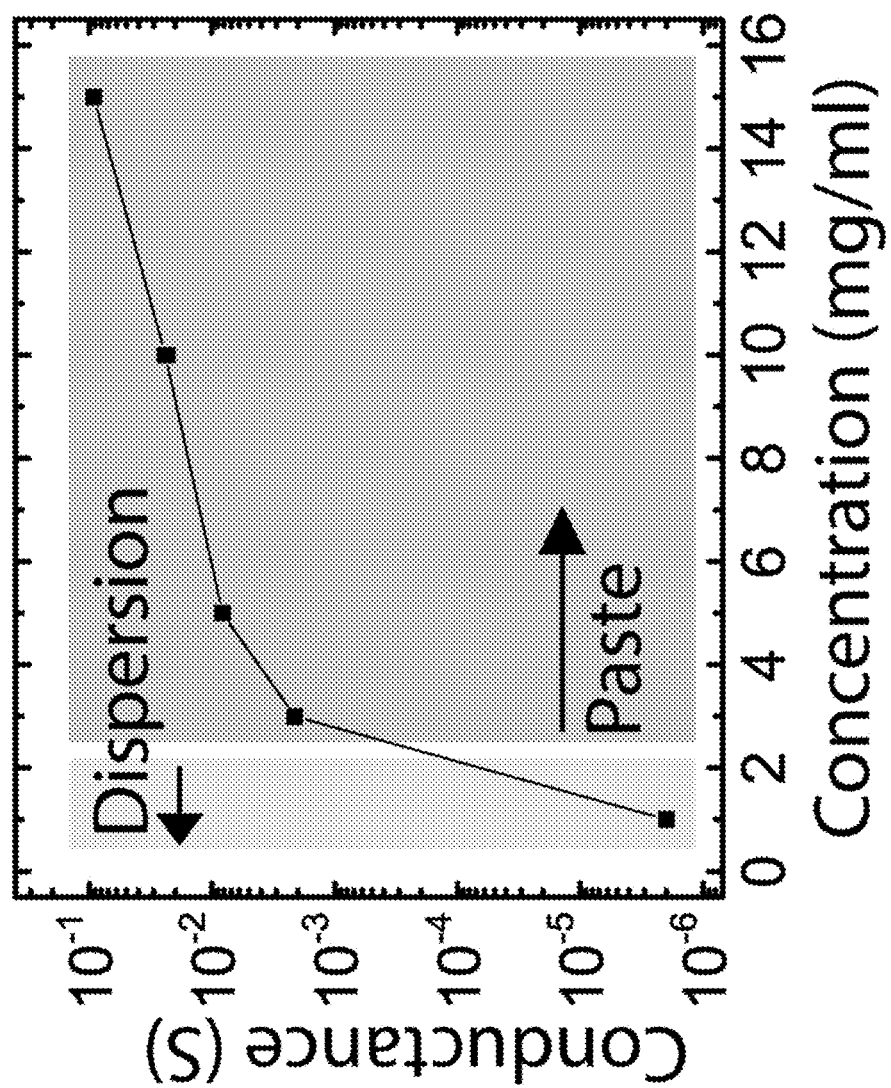
FIG. 4 shows a dispersion and a paste, two of four continuous states of MWCNTs in m-cresol, exhibiting polymer solution-like rheological and viscoelastic properties. The transitions between these states are characterized by a threshold-like increase in electrical conductivity.
Figure 5:
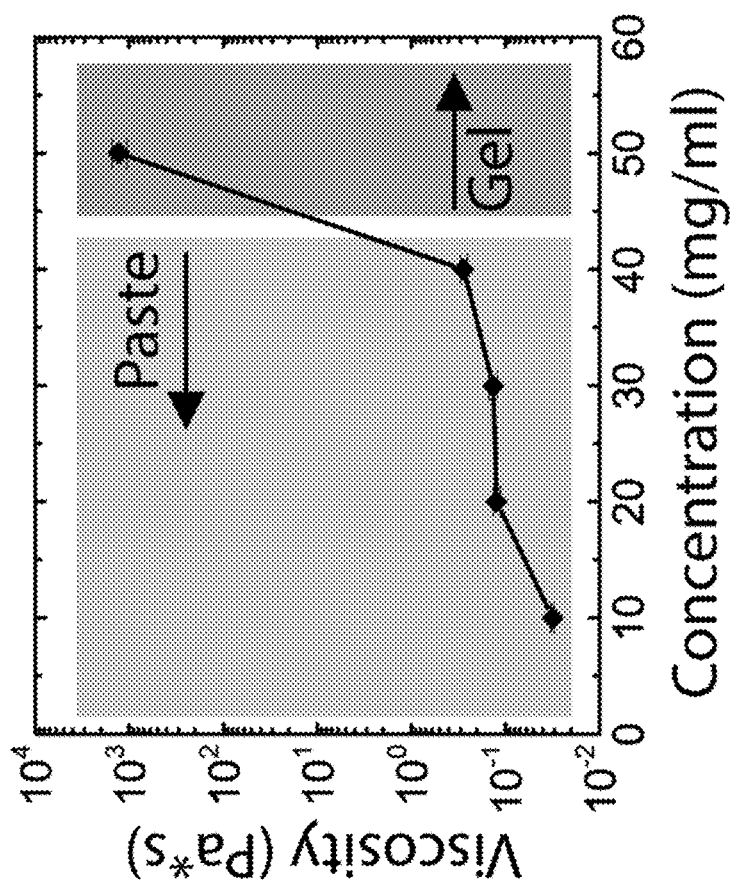
FIG. 5 depicts a paste and a gel, two of four continuous states of MWCNTs in m-cresol, exhibiting polymer solution-like rheological and viscoelastic properties. The transitions between these states are characterized by a threshold-like increase in viscosity.
Figure 6:
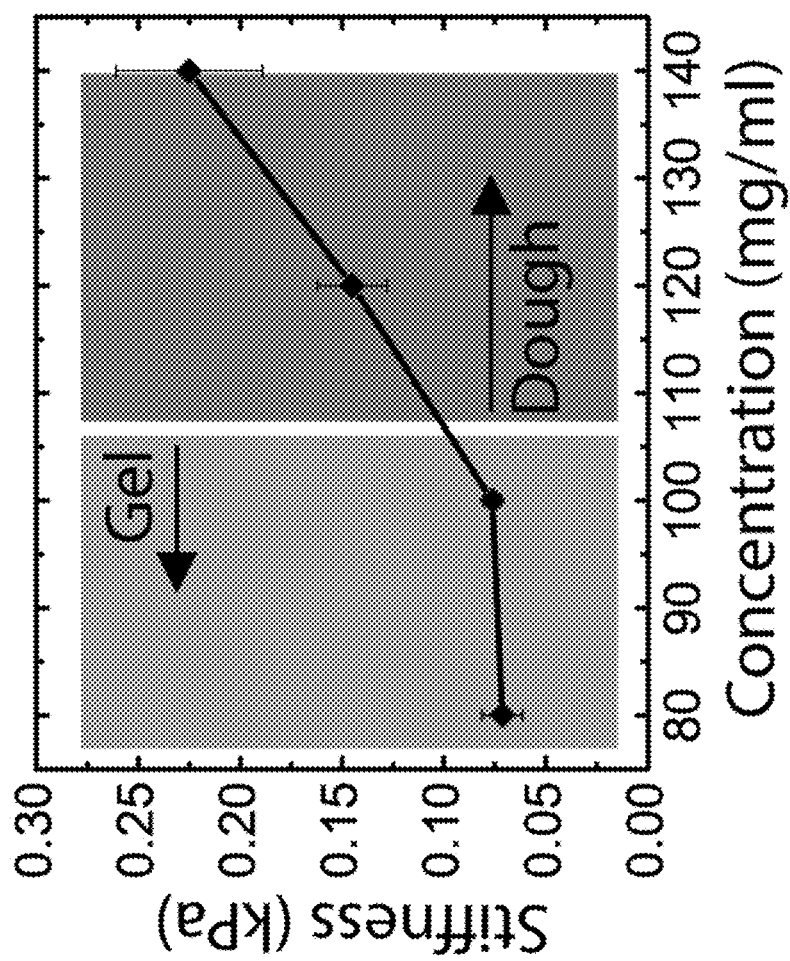
FIG. 6 shows a gel and a dough, two of four continuous states of MWCNTs in m-cresol, exhibiting polymer solution-like rheological and viscoelastic properties. The transitions between these states are characterized by a threshold-like increase in compression modulus due to the formation and gradual densification of a 3D network of dispersed nanotubes.

Four States of MWCNTs in m-Cresol.

m-cresol alone can disperse and process carbon nanotubes up to tens of weight percent. Since MWCNTs are the more common type of mass-produced carbon nanotubes and are much more affordable and available, they were chosen as the model material for most of the work in the following sections unless otherwise mentioned. Dilute dispersions were typically made by sonication and could remain stable for at least many months. The other higher concentration states were typically made by grinding. Transitions between the four states were accompanied by threshold-like changes in their electrical, rheological, and viscoelastic properties. For example, the transition from a dilute dispersion to a thick paste was accompanied by the onset of electrical conductivity around 3 mg/ml (FIG. 4), which can be attributed to the formation of a percolated nanotube network, establishing a continuous electrically conductive pathway throughout the volume. At higher concentrations, increased density of the MWCNTs network resulted in significant changes in rheological and viscoelastic properties. For example, the transition from a thick paste to a self-standing gel was marked by an inability to free flow around 40-50 mg/ml, after which the viscosity increased significantly (FIG. 5). At concentrations above 100 mg/ml, a viscoelastic, kneadable playdough-like material was obtained, which was highly cohesive and exhibited resistance to compression, as characterized by a rapidly increased compression modulus (FIG. 6).

The continuous transition between these four highly processable, polymer solution-like states indicates that the nanotubes were dispersed and outstretched in m-cresol, forming a cohesive network that densifies at increasing concentrations. If the nanotubes were still agglomerated as in their powders, the corresponding high concentration products would not be cohesive due to segregated domains of agglomerated nanotubes, resulting in poor processability (see schematic illustrations in FIG. 7). These four states were observed for all the carbon nanotubes tested (e.g., unfunctionalized single walled or multiwalled tubes of various sizes). As demonstrated by the examples below, m-cresol indeed offers unprecedented versatility for processing carbon nanotubes for existing and new applications.

Dilute Dispersion and LB Assembly.

Figure 8:
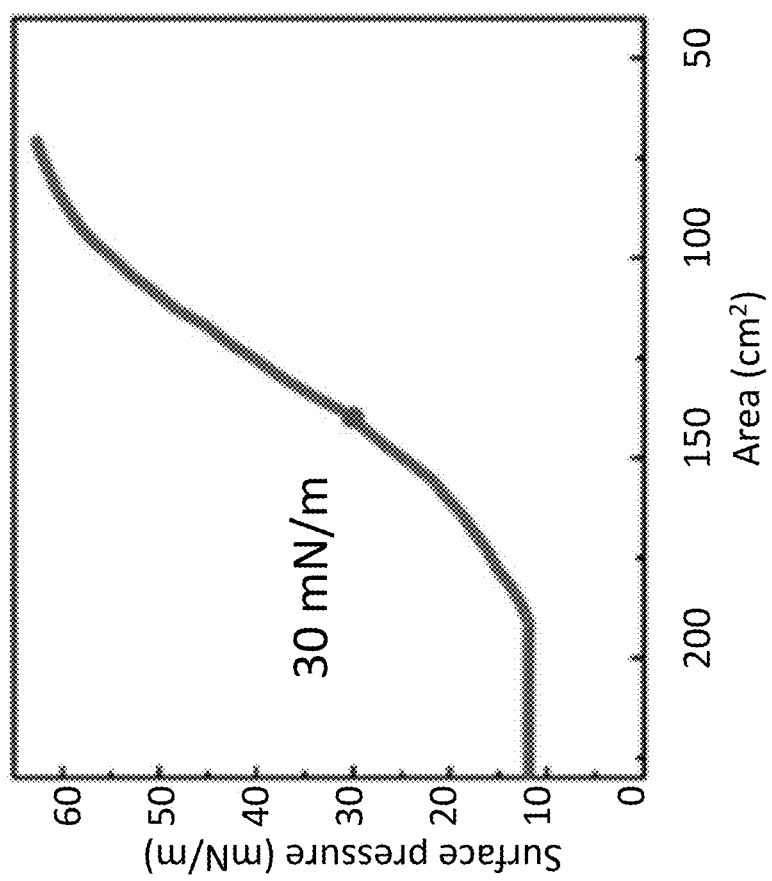
FIG. 8 shows an isotherm obtained during compression of monolayers of MWCNTs from dilute dispersion by Langmuir-Blodgett (LB) assembly. Isothermal compression of the monolayer increases its surface pressure, indicative of higher nanotube density.
Figure 9:
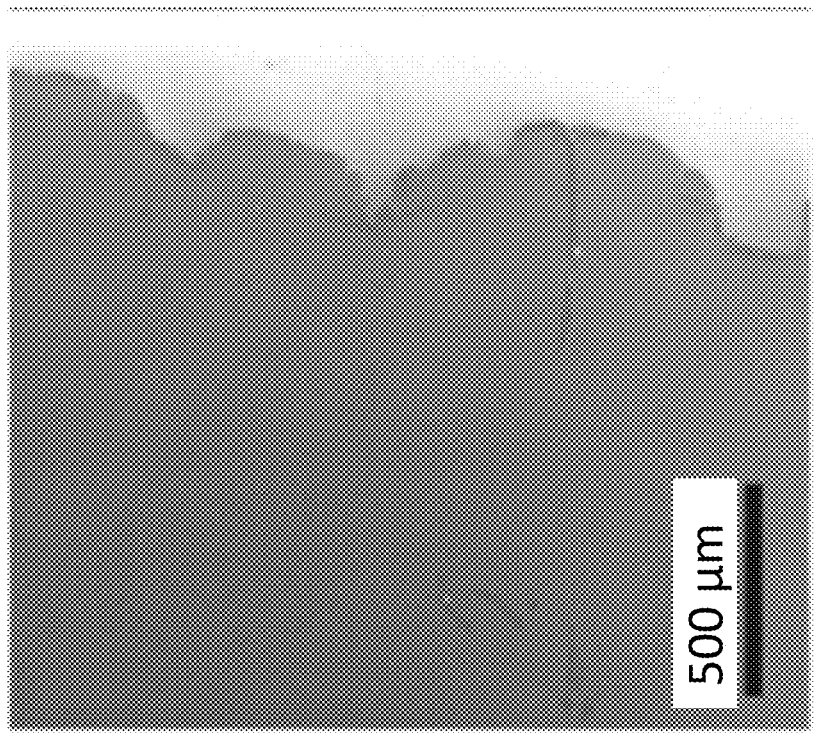
FIG. 9 depicts monolayers of MWCNTs from dilute dispersion by LB assembly. The scanning electron microscopy (SEM) image shows the film as a continuous, uniform, paper-like monolayer.
Figure 10:
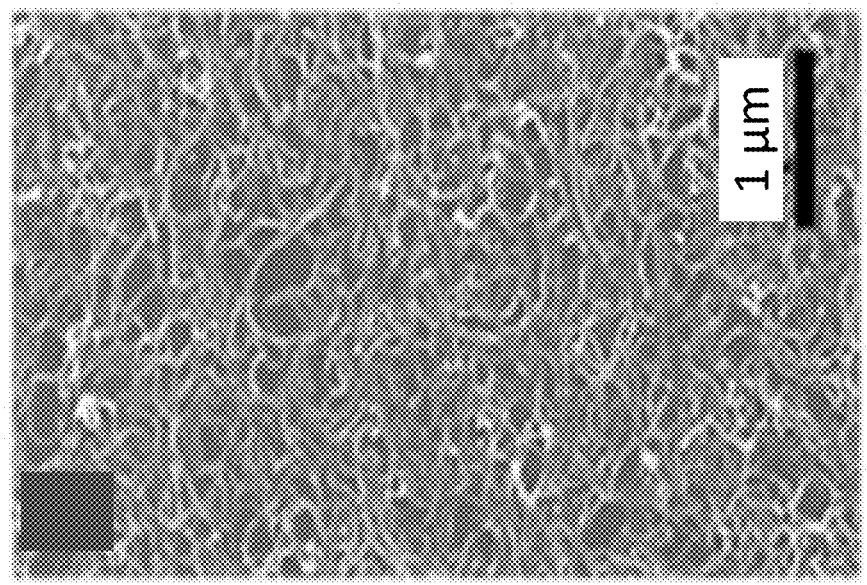
FIG. 10 shows monolayers of MWCNTs from dilute dispersion by LB assembly. The SEM image shows the film as a continuous, uniform, paper-like monolayer made of a network of nanotubes.

The m-cresol dispersion can be directly applied to LB assembly for making monolayer thin films. Successful LB monolayer assembly requires high quality nanotube dispersions without other surface-active materials to disrupt their packing on the water surface, which is challenging for additive-based carbon nanotube dispersions. Since m-cresol can gradually dissolve in water, it dissipated into the subphase after spreading the nanotubes on the water surface, leaving clean nanotubes on the water surface. The water-supported monolayers could be further densified by closing two barriers, yielding a positive surface pressure (FIG. 8), which could then be transferred to a substrate by dip-coating. FIG. 9 is a low magnification SEM overview of a MWCNT film on a glass slide collected at a surface pressure of 30 mN/m, which is continuous, uniform, and cohesive. Since many of the starting MWCNTs were curled, twisted, or even kinked, and could not lay flat, the near-monolayer thickness of the film (FIG. 10) also confirmed that the heavily agglomerated MWCNTs in the starting powders indeed had been well separated in m-cresol. Strong van der Waals attraction at the tube-tube junctions contributed to the continuity and cohesiveness of the MWCNT monolayer.

Figure 11:
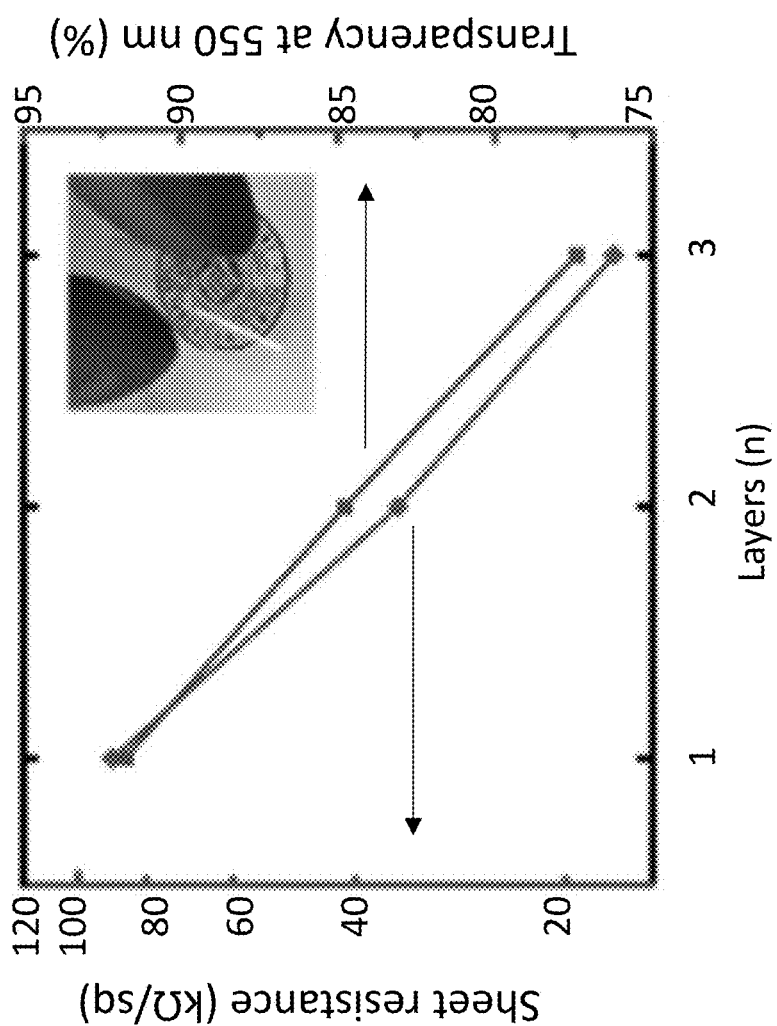
FIG. 11 depicts monolayers of MWCNTs from dilute dispersion by LB assembly. Sheet-resistances and the corresponding transparencies of MWCNT layers on PET substrate made by repetitive dip-coating are depicted.

Transferring the nanotube monolayer onto soft plastic substrates such as poly(ethylene terephthalate) formed a flexible transparent conductor. Sheet resistance and optical transparency of the nanotube coating could be fine-tuned further by precisely controlling the number of deposited layers as well as the packing density within each monolayer (FIG. 11). For example, a sheet resistance of 90 kΩ/sq was obtained at 72% of optical transparency. Using m-cresol as a processing medium did not damage the surface of the nanotubes nor leave hard-to-remove residues and resulted in satisfying conductivity of the LB films without the need for extensive further annealing steps. Similarly, LB assembly of SWCNT monolayers was achieved.

Thick Paste, Blade Coating, and Screen-Printing.

Figure 7:
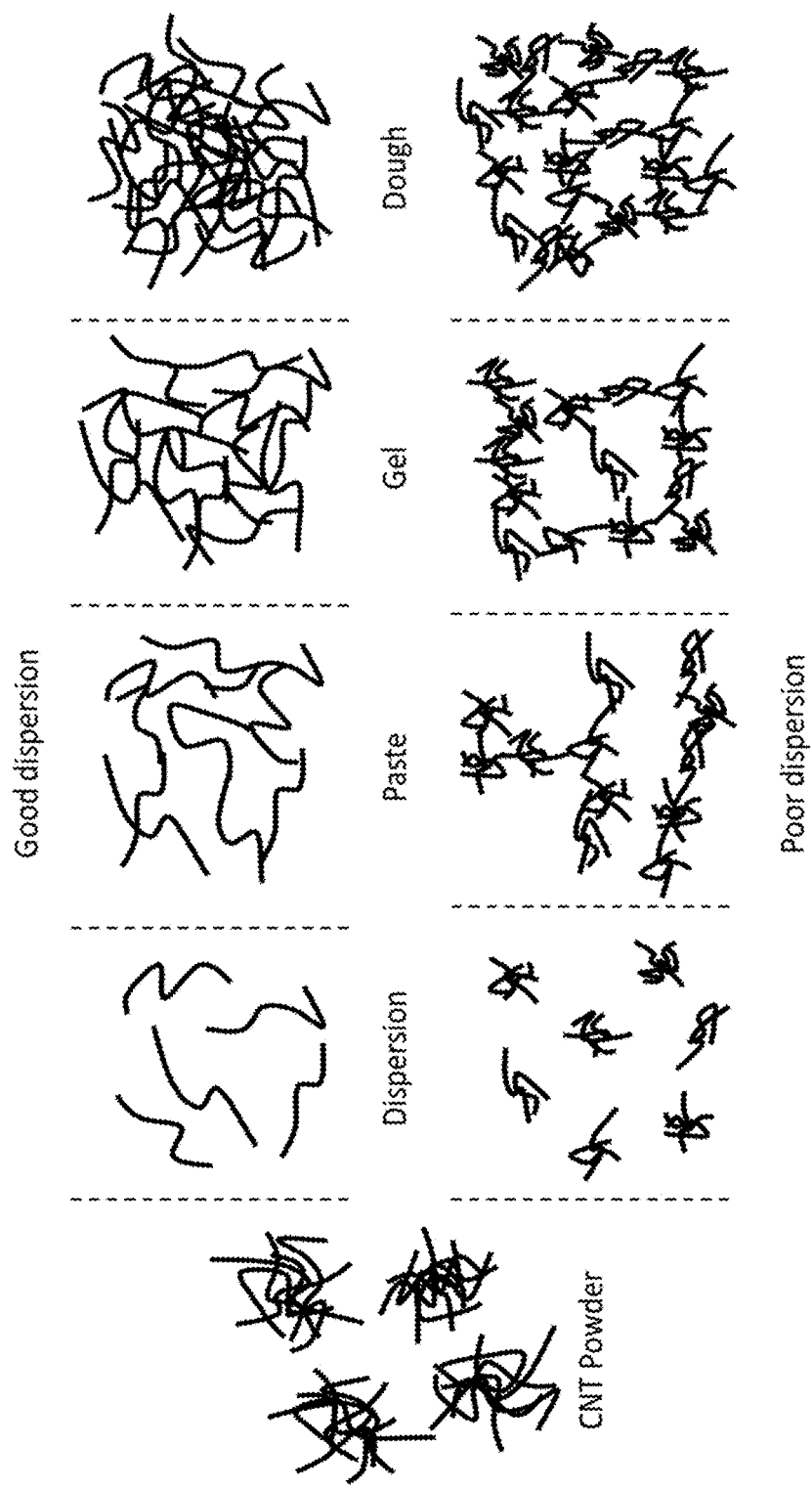
FIG. 7 shows schematic drawings illustrating carbon nanotubes in a powder starting material that are heavily agglomerated and take the form of segregated particles. Top row: Well-dispersed CNTs can form continuous transition in a cresol solvent as concentration increases, starting from (1) a dilute dispersion, where nanotubes are individually separated, to (2) a thick paste, where the nanotubes form a percolated network, then (3) a self-supporting gel, in which the CNT network becomes denser and hinders the free flow but can still deform under external stress, and (4) a viscoelastic dough, where the even denser CNT network shows resistance to compression. The network of disaggregated nanotubes should be uniform for generating the desirable rheological (e.g., for spreading, coating, blending with powders, and extruding) and viscoelastic properties (e.g., for kneading and molding). Bottom row: Aggregated CNTs cannot form the aforementioned states with desirable rheological and viscoelastic properties. For example, at low concentration, the dispersion would consist of clusters of entangled CNTs, while at higher concentrations, the corresponding products would have heavily segregated domains, leading to poor processability. Impact on processability: A good dispersion can be processed into near-monolayer CNT thin films, while a poor dispersion would only yield a film made of clusters of aggregated tubes. A good paste can spread uniformly on substrates and yield a continuous CNT coating, while a poor paste would result in a discontinuous film with segregated domains. A good gel allows 3D printing using fine nozzles, while a poor gel would clog the nozzle due to the segregated blobs. A good dough is highly cohesive and can be kneaded and rolled while maintaining its continuity, while a poor dough has many weak boundaries between the segregated domains and would be too fragile to handle.
Figure 12:
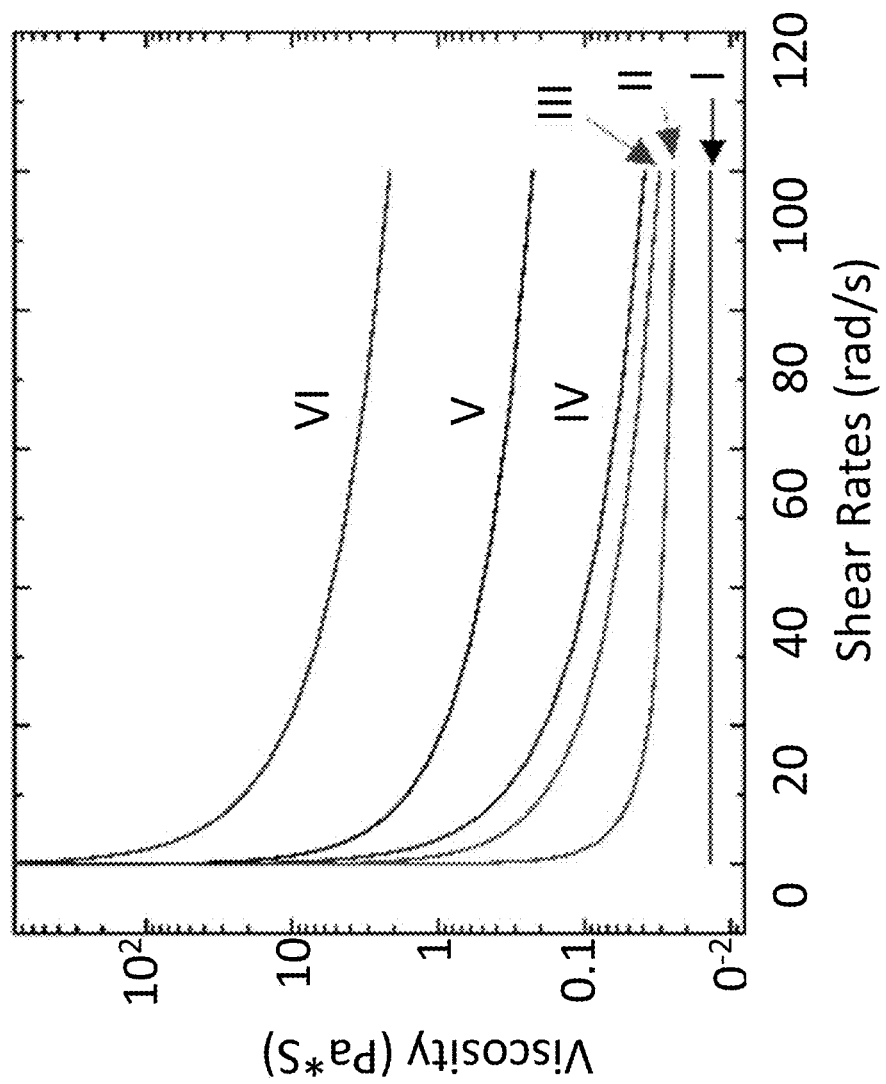
FIG. 12 shows MWCNT paste exhibits shear-thinning behavior at all the concentrations tested, which is typical for a polymer dissolved in good solvents. From II to VI, the concentrations are increased from 10, 20, 30, 40, and 50 mg/ml. Pure m-cresol (I) does not exhibit this behavior.
Figure 13:
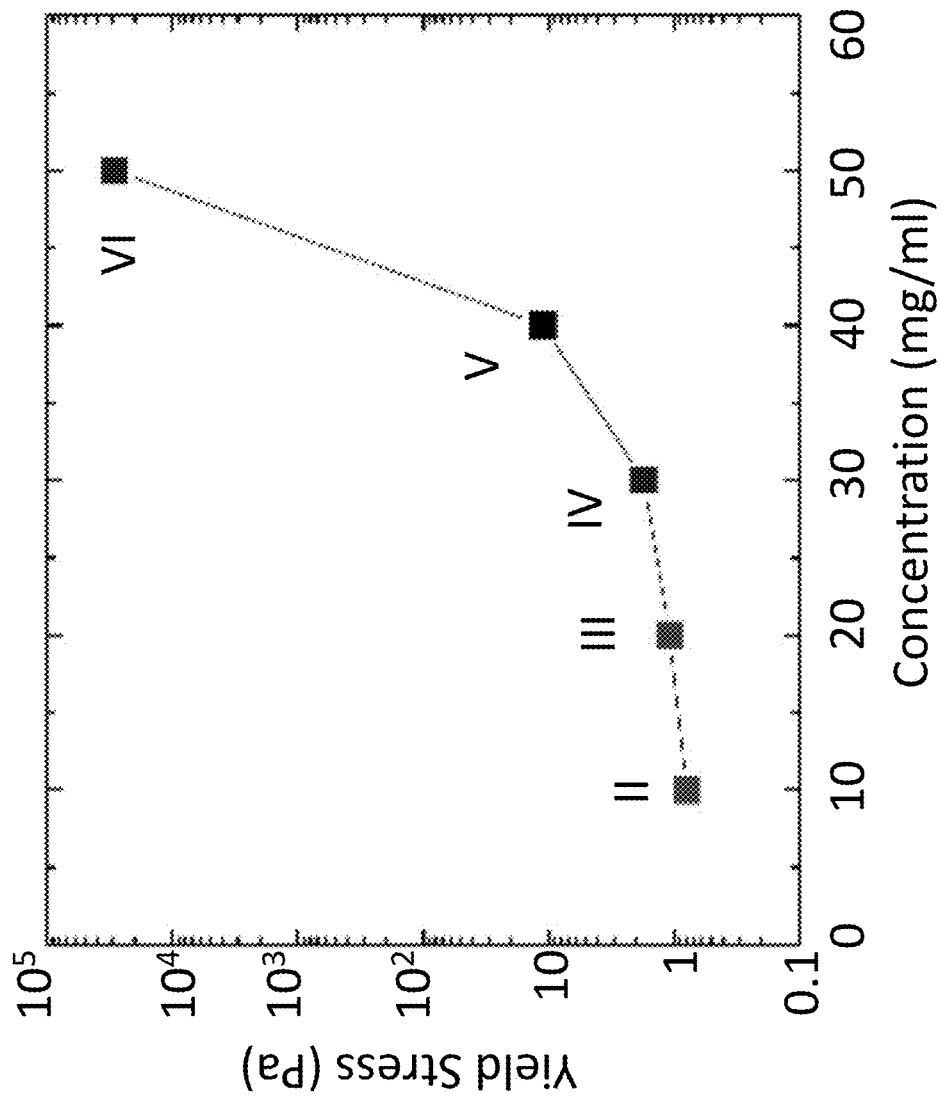
FIG. 13 shows the yield stress of the MWCNT paste increases relatively slowly as the nanotube concentration increases, until it reaches the range of the gel state (V).
Figure 14:
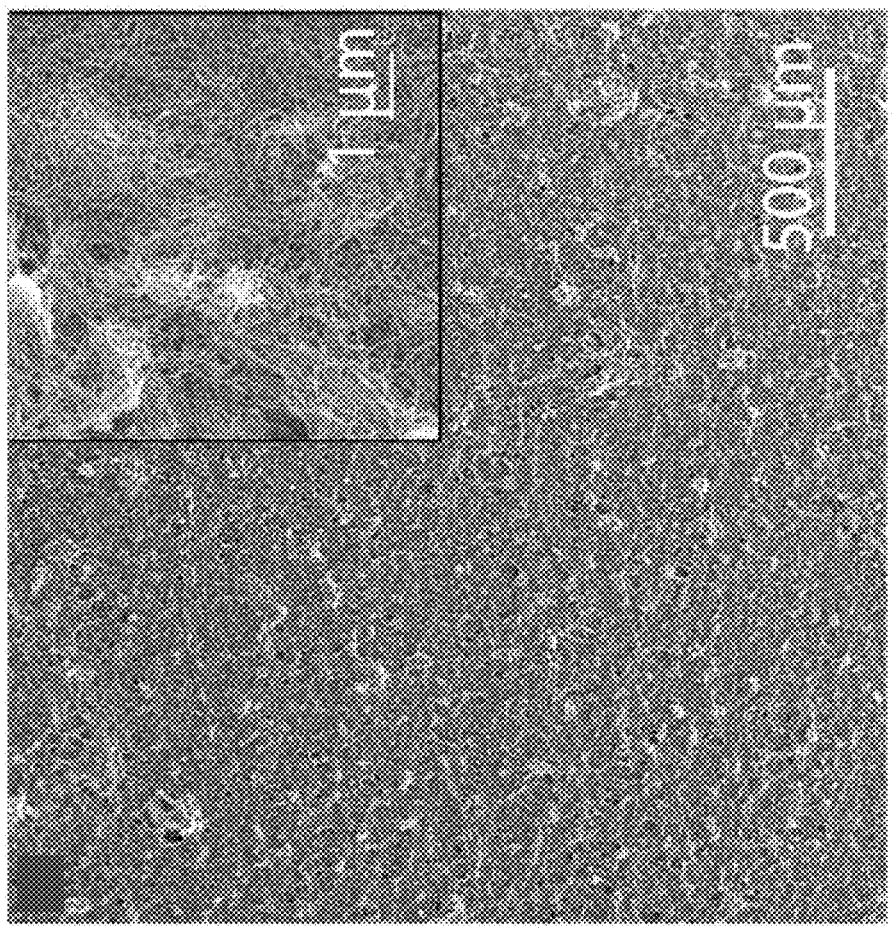
FIG. 14 shows continuous and patterned blade coating of MWCNTs from the thick paste. Blade-coating creates a continuous and uniform nanotube film on glass after drying, which is free of cracks (SEM image) that are typically seen for coatings made with other solvents, such as NMP.

Increasing the loading of MWCNTs up to 40 mg/ml resulted in a more viscous paste, which exhibited relatively high viscosity and shear thinning behavior (FIG. 12), with yield stress in the range of 1 to 10 Pa (FIG. 13), making it suitable for use by brushing or painting. In order to make a continuous film using these techniques, the paste should be sufficiently cohesive so that the coating does not break up under the shear during spreading or crack by the capillary action during drying. Therefore, the nanotubes should be interconnected throughout the paste without extensively segregated domains (FIG. 7). The paste was applied by blade coating. The oven-dried coating on glass was continuous and free of cracks over the entire area. SEM images show that it was made of an interwoven, continuous, and high-density network of nanotubes (FIG. 14). Similar to blade coating, industrial screen-printing can directly use the MWCNT paste to generate functional patterns. Blade coating is commonly used to make electrodes for energy storage devices from slurries, which often use carbon nanotubes as a conductive binder for active materials. Highly cohesive, additive-free pastes with well-dispersed nanotubes are readily compatible with these slurry processing techniques and could directly benefit this large scale application of carbon nanotubes.

MWCNT Pastes for Polymer Composites.

Polymer nanocomposite is another area that uses a very large scale of carbon nanotubes. The paste state offers a number of potential advantages for manufacturing. To start, the paste can be easily mixed with powders of polymers, which is one of the most common forms of industrial polymers. Moreover, m-cresol itself is a solvent for many commodity polymers such as PMMA, nylons, polyethyelene terephthalate, polystyrene, and phenolic resins, which helps the blending process. Using the paste also drastically reduces the amount of solvent needed for manufacturing and greatly shortens the baking time needed for solvent removal. A proof-of-concept experiment was conducted in which PMMA powders were directly mixed with the paste by mortar and pestle. The product was rolled into a flexible and highly plastic sheet, which sustained over 800% of tensile strain. Upon thermal curing at 150° C., the sheet hardened due to partial removal of m-cresol. At 1 wt. % loading of MWCNTs in PMMA, the Young's modulus of the composite (1.46 GPa) increased by 24% in comparison to a similarly processed PMMA sheet (1.17 GPa). SEM observation confirmed that the MWCNTs had been finely dispersed in the PMMA matrix. Such a soft-hard transition is critical for industrial forming techniques, which turn materials into desirable geometries and form factors. The additive-free carbon nanotube pastes in cresols can be useful for accelerating the development and manufacturing of polymer nanocomposites.

Gel and 3D Printing.

Figure 15:
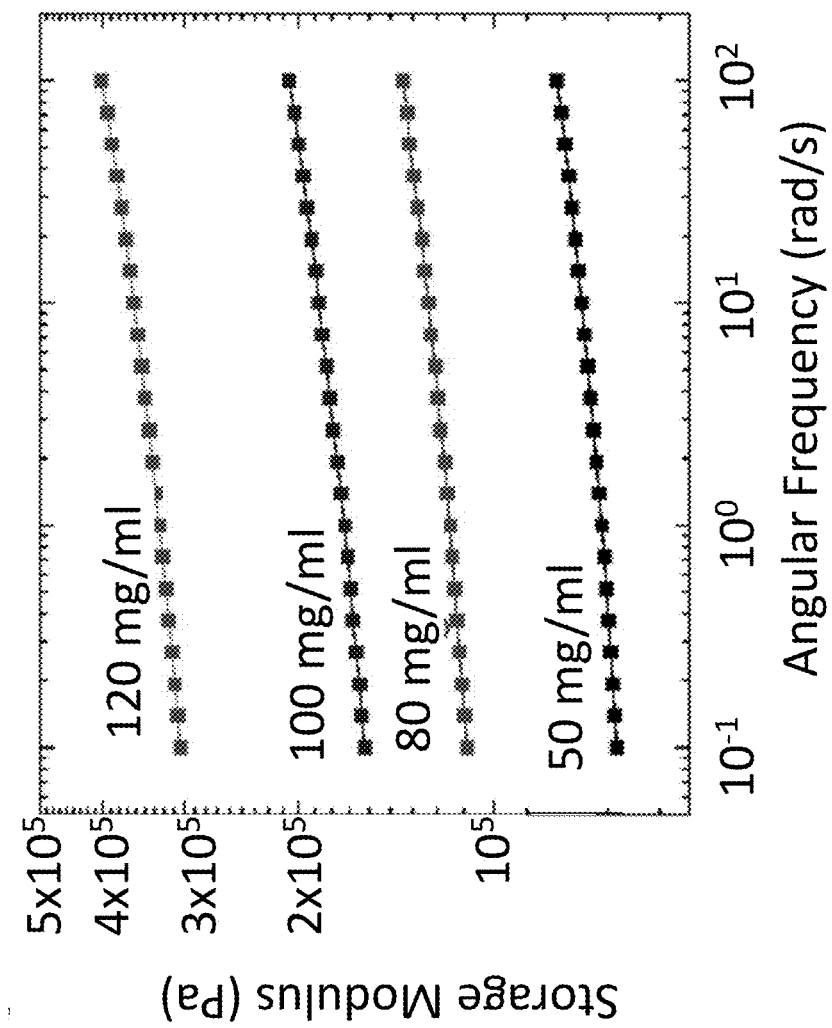
FIG. 15 shows MWCNT gels have increasingly solid-like behavior as the nanotube concentration increases, based on the results of storage moduli.
Figure 16:
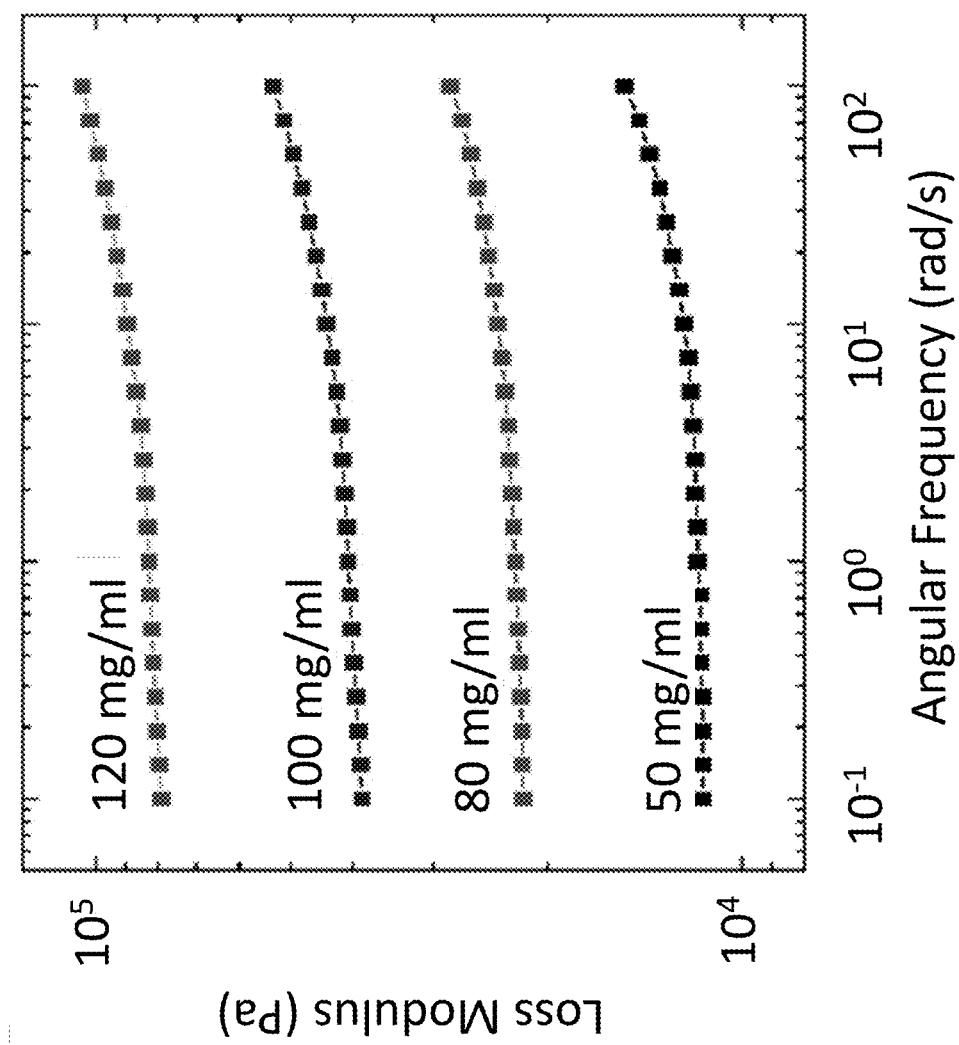
FIG. 16 shows gels have increasingly solid-like behavior as the nanotube concentration increases, based on the results of loss moduli measurements.

Above 40 mg/ml, the MWCNT network in m-cresol was sufficiently dense to hinder free flow, leading to a freestanding gel. As the nanotube concentration increased, the gel became more solid-like with an increased storage modulus (FIG. 15). The loss modulus increased more slowly than the storage modulus, rendering the gel a sufficient level of liquid character for an extrusion type of processing (FIG. 16). Therefore, the MWCNT gel could deform and reconnect easily. A MWCNT gel was extruded to form self-supporting fibers through a 0.5 mm diameter needle. Since the gel was cohesive, extrusion could be continuously operated even with finer needles (e.g., 0.1 mm diameter). This again reflects that the nanotubes were uniformly dispersed by m-cresol and outstretched like polymers in the gel, rendering it suitable rheological properties for continuous, unhindered extrusion. This gel was immediately usable for programmed and automated printing. As a proof-of-concept, a cup-shaped structure was 3D printed from the gel. The base of the cup was made of two criss-cross layers of close-packed fibers, and the side was made of vertically stacked rings. After drying, the cup structure shrank slightly isotropically but maintained its shape, resulting in a stiff solid object that could be further handled.

MWCNT Dough.

The last state of MWCNTs/m-cresol composition was a viscoelastic dough (>100 mg/ml), which could be kneaded or rolled without fracture. In contrast to a gel, when kneaded on paper, the dough did not leave any stain mark. This was due to the strong attraction between the nanotubes in the densely woven 3D network, which prevented them from leaving residues on the paper. Since the nanotube/m-cresol dough was highly kneadable and stain-free, it must be highly cohesive and free of mechanically weak boundaries between segregated grains of carbon nanotubes. As with a bread dough, the MWCNT dough could be cut into pieces and rejoined when pressed together or molded into arbitrary shapes without altering its viscoelastic properties. A thick film was cold-rolled from the dough, which was still soft and plastic, and could be reshaped using a mold. The MWCNTs doughs could be hardened to fix their shapes after heating at above 200° C. to remove the m-cresol. The hardened structures could then be returned to the soft dough state by absorbing m-cresol. This playdough-like processability is useful for the fabrication of arbitrarily shaped 3D solids of neat carbon nanotubes for a range of electronic, thermal, and energy applications.

Materials and Methods

Materials

Carbon nanotube powders of various types, sources, and levels of purities from three vendors were tested, and all dispersed well in m-cresol and its liquid mixtures with other isomers. These include: (1) CoMoCAT® MWCNTs (98% carbon content), CoMoCat® SWCNTs (90% carbon content, 90% semi-conducting), and double-walled carbon nanotubes (90% carbon content, made by chemical vapor deposition (CVD)) were obtained from Sigma-Aldrich; (2) SWCNTs (P2, 90% purity) and carboxylic functionalized SWCNTs (P3, 90% purity) were made by arc-discharge and obtained from Carbon Solution Inc.; (3) Graphitized MWCNTs (TNGM2, 99.9% purity, approximate lengths of 50 μm), low density SWCNTs (TNSR, 95% purity, approximate lengths of 5-30 μm, 0.027 g/cm$^3$), high density SWCNTs (TNST, 95% purity, 0.14 g/cm$^3$), short SWCNTs (TNSSR, 95% purity, approximate lengths of 1-3 μm), and short MWCNTs (TNSM2, 95% purity, approximate lengths of 0.5-2 μm) were all made by CVD and obtained from TimesNano.

P2 SWCNTs and MWCNTs (CoMoCat®) were used for demonstrating LB assembly. The results of the pastes, gels, and doughs were demonstrated with CoMoCat® MWCNTs as the model material, although other types of MWCNTs work as well.

Other chemicals were purchased from Sigma-Aldrich and used as received, including m-cresol (99%), o-cresol (99%), p-cresol (98%), toluene (99.9%), phenol (>99%), DMF (99.8%), NMP (anhydrous, 99.5%), PMMA (200,000 Mw), and methyltrichlorosilane (99%). A ternary isomer mixture of cresol (>99 wt. %, 1:1:1 ratio) was purchased from Fisher Scientific and used as received.

LB Assembly and Transparent Conductive Thin Films.

Powders of MWCNTs or SWCNTs were first mixed with m-cresol using a mortar and pestle, then sonicated in pulse mode (2 s on/2 s off cycles for a total of 1 hour) using a Qsonica Q125 sonicator rated at 125 W, equipped with a ¼ inch standard tapered tip at 90% power. After sonication, the dispersion was subject to exhaustive high-speed centrifugation at 11000 rpm for 1 hour using an Eppendorf 5804 desktop centrifuge. The supernatant was recovered and used. Samples for making transparent conductors were first purified by a non-oxidative route, including washing in 3M HCl at 65° C. for 4 hours, followed by baking in a muffled furnace at 250° C. for 1 hour.

All parts of the LB system (Nima Technology) were thoroughly cleaned with acetone before use. Using a glass syringe, 1 ml of m-cresol dispersion (SWCNT or MWCNT) was carefully spread onto the air-water interface. A tensiometer with a Wilhelmy plate was used to monitor the surface pressure while closing the barriers. At surface pressures of around 40 mN/m for SWCNTs and 30 mN/m for MWCNTs, monolayer films were dip-coated onto a substrate (typically glass slides) with a pull speed of 2 mm/min. The obtained LB films were annealed at 150° C. for 30 min before subsequent LB deposition to produce multi-layered films.

Blade-Coating and Screen Printing.

The MWCNTs paste in m-cresol (100 mg/ml) was made by direct mixing using a mortar and pestle, then diluted to 40 mg/ml, and hand ground further to yield a spreadable thick paste. Glass slides were first silanized with 5 wt. % methyltrichlorosilane in toluene for 10 minutes, and then washed thoroughly using toluene followed by acetone. Two strips of Kapton tapes were attached to the sides of the silanized glass slide as spacers to control the thickness of the coating. About 0.3 ml of MWCNT paste was deposited onto the shallow trough created by the Kapton tapes. A razor blade was used to drag the paste to coat the slide. The coating was left to dry at 150° C. for 2 hours. Control experiments were done using NMP instead of m-cresol as the solvent at the same nanotube concentration. Screen-printing was done on paper through a mask using a paste of 10 mg/ml.

Polymer Composite

To make the MWCNT/PMMA nanocomposite, a MWCNTs/m-cresol paste (40 mg/ml) was ground directly with powders of PMMA (200,000 Mw) using a mortar and pestle for 10 minutes. The composite was then flattened by cold rolling, and it turned flexible and rubbery after being air-dried. Curing at 150° C. for 2 hours significantly hardened the piece and fixed its shape.

3D Printing.

The MWCNTs/m-cresol gel was made by direct mixing using a mortar and pestle at a concentration of 120 mg/ml. The resulting mixture was diluted to 80 mg/ml and ground further. The gel was loaded into a syringe and manually extruded from needles with diameters of 0.1 and 0.5 mm, which could be fitted onto a 3D printer (Hyrel 30M). The printed 3D structure could be removed from the glass substrate after being air-dried for 12 hours and could be further hardened by baking to remove m-cresol.

MWCNTs Dough.

The MWCNT/m-cresol dough was made by direct mixing using a mortar and pestle at a concentration of 300 mg/ml or higher. The mixture was then diluted to 150 mg/ml and ground further to yield a dough-like material, which was kneaded to the shape of a ball. Kneading or rolling a nanotube dough does not stain the substrate, while doing so with a gel or paste would result in significant staining. A kneaded dough was sandwiched between two stainless steel foils and cold rolled to a film with a final thickness of 200 μm, which could be cut into various shapes with a razor blade or cookie cutters.

Characterization

Dispersions of carbon materials in m-cresol were drop-casted onto silicon wafers and dried at 200-250° C., before SEM (FEI Nova 600 system) and atomic force microscopy (AFM) (Park Systems XE-100, tapping mode). UV/vis spectra were taken with an Agilent 8453 UV/Vis spectrometer. NIR spectra were taken using a Perkin Elmer LAMBDA 1050 spectrometer. TEM images were taken with a JEOL ARM300F GrandARM transmission electron microscope. Drop cast SWCNTs were air dried and rinsed with water and ethanol before Raman spectroscopy measurement (WITec Alpha 300, 532 nm excitation). FTIR spectra were recorded on a PerkinElmer Instrument spectrometer (Spectrum Spotlight 300). $^1$H-NMR spectra were acquired on a 400 MHz Agilent DD MR-400 NMR system. The samples were prepared by adding 100 μl of SWCNT or MWCNT dispersions in m-cresol in 1 ml of $CDCl_3$. The nanotubes were found to be stably dispersed during the entire duration of the NMR experiments. The transparency of the LB films was measured using an Agilent 8453 UV/Vis spectrometer. The sheet resistance of the films was obtained using an in-line four-point probe equipped with a Keithley 2400 source meter. Viscoelastic and rheological properties were measured using an Anton Paar MCR 502 rheometer using a cone-on-plate configuration. The cone had a 25 mm diameter with a 5° gap angle. Viscosity versus concentration measurements were measured with a rotation speed of 1°/s. Yield-stresses were obtained using a Herschel-Bulkley regression included in the Anton Paar software package. Shear-thinning viscosities were measured with a linear ramping shear rate between 0.01 to 100 rad/s. Storage and loss moduli were measured simultaneously using the same rheometer setup at an amplitude of 1%. Tensile and compression tests were done on a Bose electroforce 5500 tester. The composite films were cut into dog bone shapes and pulled at a rate of 0.05 mm/s until failure. Only the results from samples that failed in the middle were considered. Gel and dough samples for compression tests were first molded into cylindrical shapes and carefully transferred to the tester. Compression was done at 0.005 mm/s until the sample ruptured. The slope of the first linear region of the stress-strain curve was taken as the compression modulus.

Example 2

This Example illustrates the use of cresols as a minority cosolvent to form surfactant-free dispersion of SWCNTs and MWCNTs in combination with organic solvents without the need for surface functionalization.

Experimental

Materials m-cresol (98% purity), n-hexane, 1,4-dioxane, toluene, anisole, n-methyl-2-pyrrolidone, chloroform, and acetone, $CDCl_3$, and DMSO-$d_6$ were purchased from Sigma-Aldrich and used as is. Ethanol (200 proof) was purchased from Fisher Scientific and used as received. All the nanotubes used in this example, including powders of MWCNTs (TNGM2) and SWCNTs (TNSR), were obtained from the manufacturer Timesnano under Chengdu Organic Chemicals Co. Ltd.

Spectroscopy $^1$H-NMR was conducted using a Bruker Au400 NMR. Each NMR sample was made by diluting a 100 μL of m-cresol/nanotube sample with 1 mL of deuterated solvents. These dispersions were then loaded into a standard liquid NMR tube and inserted into the NMR device. The NMR experiment was done at 32 scans per spectrum at room temperature. The samples used for obtaining the spectra in FIG. 17A were prepared by adding 100 μL of m-cresol/MWCNTs dispersions with concentrations of 1.0 mg/ml, 0.8 mg/ml, 0.6 mg/ml, 0.4 mg/ml, and 0.2 mg/ml into 1 ml of $CDCl_3$. While the concentration of the MWCNTs was varied, the concentration of m-cresol remained the same for all the NMR samples. Raman spectroscopy studies were conducted using a HORIBA LabRAM HR Evolution confocal Raman spectrometer. The m-cresol/nanotube samples were prepared in a mortar and pestle at 60 mg/ml for SWCNTs and 100 mg/ml for MWCNTs. After grinding for 10 minutes, the nanotube pastes were transferred to a glass slide for Raman study using a fixed excitation wavelength of 532 nm. The laser power was modulated with neutral density filters to avoid overheating the samples and completely evaporating off m-cresol at the sampling spots. Each spectrum was recorded by averaging 30 scans at a rate of 1 s per scan. FTIR spectroscopy was carried out using a Nicolet IS50 spectrometer in transmission mode using potassium bromide windows (Alfa Aesar). For each m-cresol/MWCNTs sample, a small volume was sandwiched between two potassium bromide windows and squeezed to make the MWCNT layer as thin and homogeneous as possible before taking the transmission measurement.

Dilution of m-Cresol/MWCNTs in Common Organic Solvents

The initial MWCNT stock dispersion was made by adding 150 mg of MWCNT powders to 30 ml of m-cresol. The mixture was then sonicated at 90% power for a total of 2 hours at 2 s/2 s on/off cycles using a Qsonica Q125 sonicator rated at 125 W. After sonication, the dispersion was centrifuged for 1 hour at 11,000 rpm using an Eppendorf 5804 desktop centrifuge (equivalent to 15,554×g). The dark supernatant was then used as the stock dispersion and was diluted with selected organic solvents so that the fraction of m-cresol is eventually at 20 vol %. The solvents tested include n-hexane, 1,4-dioxane, toluene, anisole, chloroform, acetone, and ethanol. Each diluted dispersion was sealed in a 20 ml scintillation vial for visual inspection at selected times.

LB Assembly

LB assembly was performed on a homemade mini LB trough (2.5×13 cm), which was carefully cleaned with acetone and deionized (DI) water, and finally filled with DI water. Spreading samples of MWCNTs were pipetted from the bottom of the corresponding vials, instead of from the supernatant, to avoid sampling bias favoring only the well-dispersed part of the samples. After spreading, the floating monolayers were densified by moving barriers and transferred to silicon wafers (1 cm×1 cm) by dip coating.

Air-Brushing

SWCNT ink for air brushing was made by diluting 100 ml of 1.0 mg/mL SWCNTs in m-cresol with 100 mL of toluene. Spraying was done using a Paasche VLST-Pro air brush with a 0.7 mm diameter spray nozzle attachment. The dispersion was then sprayed onto a substrate, including cotton cloth, paper, and copper foil, placed on a hot plate preheated at around 200° C.

Sheet Resistance

Measurements were made using a 4-point probe made by Alessi industries. The probe head has a line of 4 equally spaced needle electrodes with diameter of around 0.7 mm and end-to-end distance around 6 mm. For each 9 cm×9 cm sample, 72 measurements were made at different positions roughly 8 mm apart. Sheet resistance was calculated based on the I-V curve scanned between −0.5 to 0.5 mV.

Results and Discussion

Spectroscopic Studies of Cresol-Nanotube Interaction

Finding compatible solvents requires the understanding of how cresol molecules interact with nanotubes to disperse them so well, which was investigated with several spectroscopic techniques. To start, $^1$H-NMR and Raman spectroscopy were used to understand why cresols can disperse nanotubes so well. Since non-functionalized nanotubes should not have any signal in $^1$H-NMR, the technique is particularly well suited to investigate the changes in the local chemical environment of the solvent molecules before and after interacting with CNTs. Proton signals detected by $^1$H-NMR are determined by the electron density of hydrogen atoms on the cresol molecules, which can help to identify the part of the m-cresol molecule that interacts with the carbon surface. On the other hand, Raman spectroscopy can detect the change in electron density at the $sp^2$-conjugated surface of nanotubes. If corroborating evidences can be obtained from $^1$H-NMR and Raman spectroscopy studies, an interaction mechanism can be elucidated.

Figure 17A:
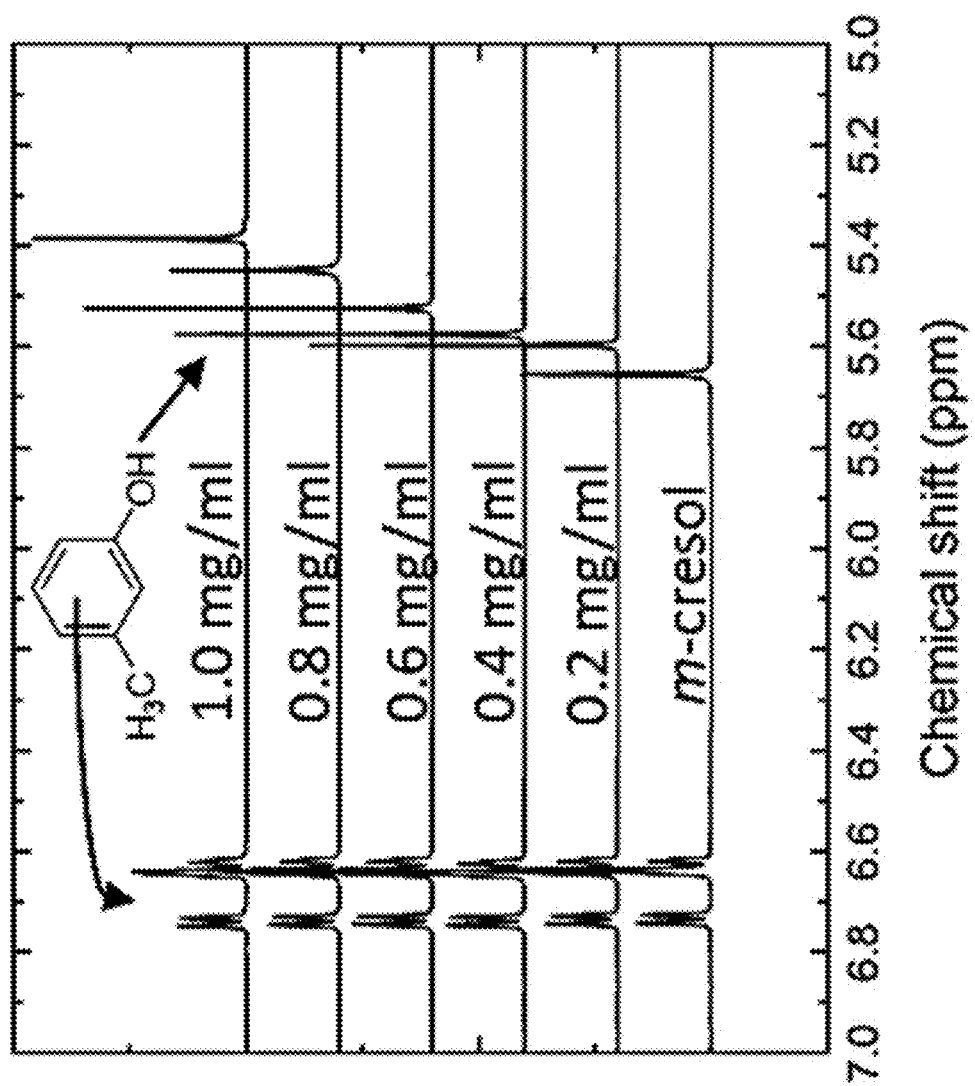
FIG. 17A depicts $^1$H-NMR spectra showing that the peak of the phenolic hydroxyl proton in m-cresol shifted upfield continuously with increasing MWCNT concentration with (FIG. 17B) a largely linear correlation.

For simplicity, m-cresol was used throughout the study because it is the only liquid cresol isomer at room temperature. Since m-cresol is an aromatic methylphenol, intuitively one would expect it to be attracted to the graphenic surface of nanotubes through π-π interactions, as noted in earlier reports. However, $^1$H-NMR spectroscopy studies of m-cresol/nanotube dispersion diluted in CDCl$_3$ revealed an evident shift of the resonance peak corresponding to the phenolic hydroxyl proton, but not for the protons attached to the aromatic ring. Without the nanotubes, the chemical shift of the phenolic hydroxyl proton is at 5.68 ppm (FIG. 17A, bottom). In the presence of dispersed MWCNTs, the chemical shift moves upfield to 5.38 ppm (FIG. 17A, top). A lower chemical shift suggests that the phenolic hydroxyl proton has become more shielded due to increased local electron density when interacting with nanotubes. Notably, the peaks corresponding to all the other protons in m-cresol, including the four aromatic protons in the range of 6.60 ppm to 7.10 ppm and the three methyl protons at 2.25 ppm, remain unchanged.

Figure 17B:
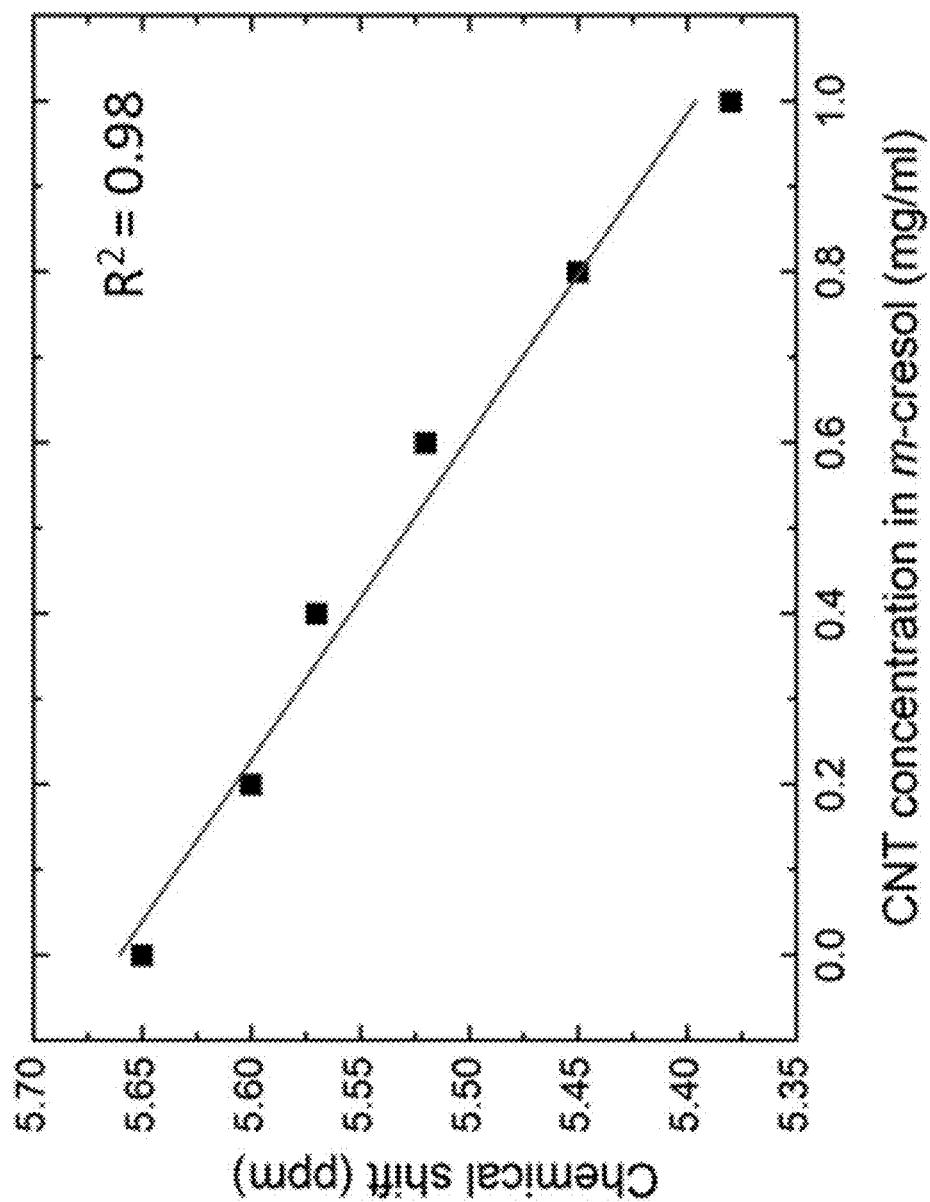
FIG. 17C depicts Raman spectra showing that the G-band centered around 1578 cm$^{-1}$ shifted towards high wavenumber after interacting with m-cresol, but not after interacting with NMP.

In a cresol-nanotube dispersion, there should be both free m-cresol molecules and those interacting with nanotubes. However, only a single phenolic hydroxyl proton peak is observed in the $^1$H-NMR spectra, indicating that the exchange speed between the two types of m-cresol molecules is much faster than the timescale of each NMR scan. Therefore, the recorded chemical shift represents a population average of the two types of m-cresol molecules. Increasing the concentration of nanotubes in the dispersion increases the fraction of interacting m-cresol molecules, which should move the chemical shift further upfield. As shown in FIG. 17A, this has indeed been observed. The chemical shift of phenolic hydroxyl proton has a largely linear correlation with the MWCNT concentration, suggesting that this is a fast exchange system (FIG. 17B) involving two types of m-cresol molecules.

Figure 17C:
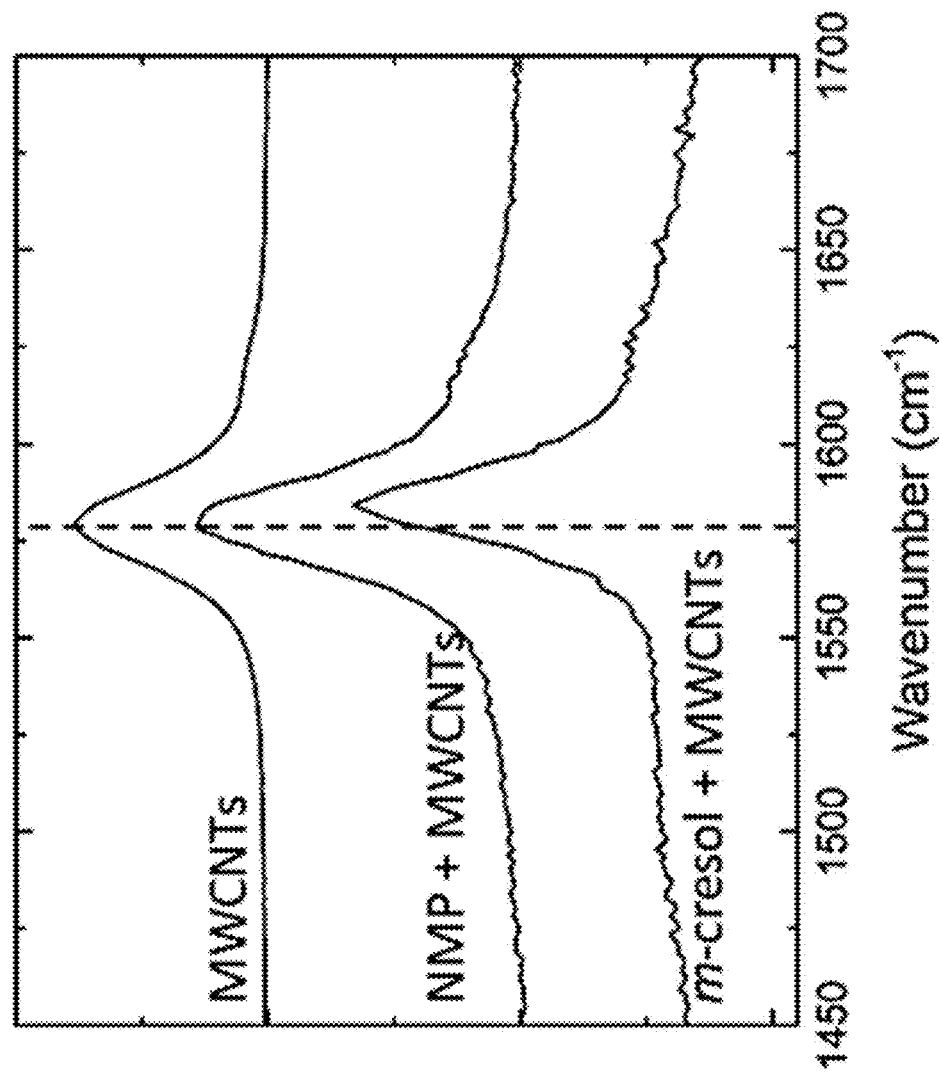

Results from the $^1$H-NMR study suggest that the electron density around the phenol hydroxyl proton has increased after interacting with the CNTs, so the electron density of the CNTs should be decreased accordingly. This is reflected in the Raman spectra of CNTs taken before and after interacting with m-cresol. As shown in FIG. 17C, a blue shift in the G-band of MWCNTs from 1577 $cm^{-1}$ to 1584 $cm^{-1}$ is observed after interacting with m-cresol, which is also observed for SWCNTs. The charge-transfer between m-cresol and nanotubes should increase the polarity of the phenolic hydroxyl bond, which should affect its vibrational modes. These changes were detected by Fourier transform infrared spectroscopy.

Criteria of Compatible Solvents for Cresol-Nanotube Complex

Figures 18A, 18B:
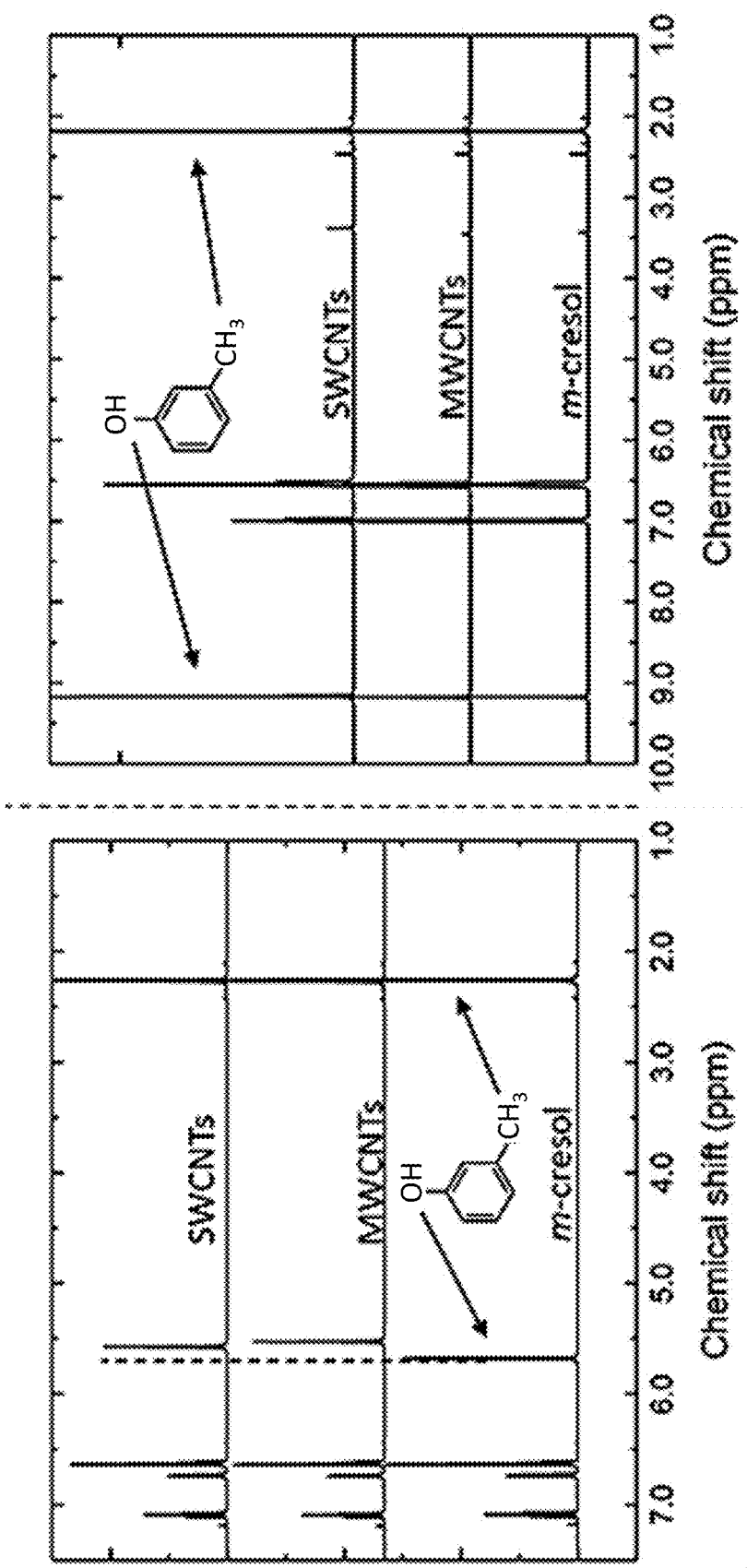
FIG. 18A shows that $^1$H-NMR spectra of m-cresol/nanotubes in CDCl$_3$ show obvious upfield shift of the phenolic hydroxyl proton peak in the presence of SWCNTs or MWCNTs.
FIG. 18B shows that in DMSO-d6, no shift is observed for any of the m-cresol proton peaks.

Since charge-transfer is electrostatic in nature, binding strength of the cresol-CNT complex should be sensitive to the dielectric constant of its surrounding solvent, which describes the solvent's ability to screen charges. Polar solvents with high dielectric constants are more effective at screening charges, and they should be able to break the cresol-nanotube complex. Here, $^1$H-NMR becomes a very useful tool for examining the stability of the cresol-nanotube charge-transfer complex in a particular solvent, which can be used to identify compatible solvents for the cresol-nanotube dispersions. To prepare samples for the NMR experiments, the nanotube dispersions in m-cresol need to be diluted in a miscible deuterated solvent. If the complex is stable in a selected solvent, one would expect to see an upfield shift of the resonance peak of phenolic hydroxyl proton as seen in FIG. 17A. Otherwise, the peak position would not be affected by the presence of nanotubes. The $^1$H-NMR measurements in FIG. 17A were carried out in deuterated chloroform, which has a low dielectric constant of 4.81. It was found that both the SWCNT and MWCNT dispersions in m-cresol can be diluted with CDCl$_3$ without any sign of aggregation even after months. In the corresponding $^1$H-NMR spectra, the upfield shift of the phenolic hydroxyl proton resonance can be clearly seen (FIG. 18A) for both the SWCNT and MWCNT dispersions. In contrast, when the dispersions were diluted in deuterated dimethyl sulfoxide (DMSO-d$_6$), which is a polar solvent with a high dielectric constant of 46.7, significant aggregation occurred after about 2 hours. In the corresponding $^1$H-NMR spectra taken while the dispersion in DMSO-d$_6$ appeared homogeneous, the phenolic hydroxyl proton peak remained unchanged with or without nanotubes (FIG. 18B). These results indicate that $^1$H-NMR can be used as an analytical tool to mechanistically search and evaluate compatible solvents for the cresol-nanotube systems.

Figure 18C:
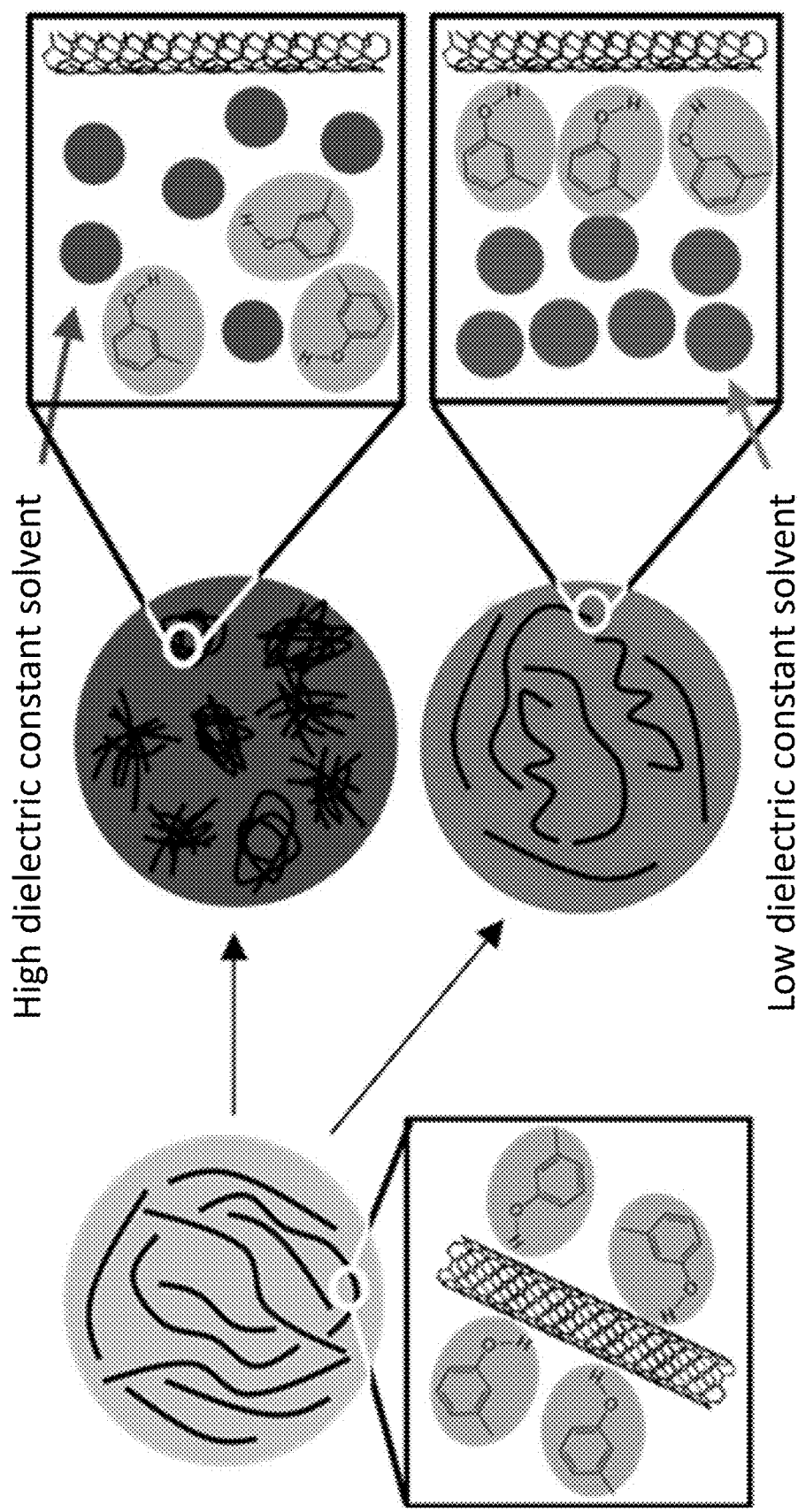
FIG. 18C shows a schematic drawing illustrating the general criteria for identifying cresol-compatible solvents for processing nanotubes. High dielectric constant solvents de-stabilize the m-cresol/nanotube charge-transfer complexes, leading to aggregation of nanotubes. Low dielectric constant solvents that are non-reactive and miscible with cresols stabilize the complex and maintain the nanotube dispersion.

The results of the NMR experiments lead to the hypothesis that cresol-compatible solvents for dispersing nanotubes should be miscible with cresols and have relatively low dielectric constants. As illustrated by the schematic drawing in FIG. 18C, these less polar solvents won't break the cresol-nanotube charge-transfer complex and essentially disperse the cresol-nanotube complex as a whole. This helps to greatly reduce the amount of cresols needed to disperse CNTs. In contrast, high dielectric constant solvents are better at screening the electrostatic interaction, leading to dissociation of cresol molecules from the nanotubes and the aggregation of nanotubes. Therefore, solvents with high dielectric constants can very effectively wash cresols away from nanotubes after solution processing, avoiding contamination of the functional nanotube surface.

Additive-Free Nanotube Dispersions in Mixed Solvents

With the above insight, a number of common organic solvents have been evaluated, which are sorted in Table 1 based on their dielectric constants. These solvents are selected because they are all miscible but do not react with m-cresol, and they cannot disperse nanotubes themselves. Each of these poor solvents was added to a concentrated m-cresol/MWCNTs dispersion (1.0 mg/ml) to a final volumetric ratio of 80% poor solvent. In a cresol-compatible solvent, the nanotube dispersion should stay stable, but in an incompatible solvent, the nanotubes should agglomerate. Photographs of the MWCNTs samples in the diluted solvent mixtures were taken at multiple time intervals to observe the colloidal stability of the nanotubes. The m-cresol/MWCNTs samples in non-polar, low dielectric constant solvents, including hexanes, 1,4-dioxane, toluene, anisole and chloroform, maintain visibly stable dispersions for at least 1 week. However, when diluted with polar, high dielectric constant solvents such as acetone and ethanol, the m-cresol/MWCNTs are unable to maintain stable dispersions and sediment after just 1 day.

TABLE 1

Selected common organic solvents for diluting m-cresol/MWCNTs dispersion based on the values of their dielectric constants.

| | Solvent | Dielectric constant |
|---|---|---|
| 1 | n-Hexane | 1.99 |
| 2 | 1,4-Dioxane | 2.21 |
| 3 | Toluene | 2.38 |
| 4 | Anisole | 4.33 |
| 5 | Chloroform | 4.81 |
| 6 | 1,2-Dichloroethane | 10.4 |
| 7 | Pyridine | 12.4 |
| 8 | Isopropyl alcohol | 17.9 |
| 9 | Acetone | 21.0 |
| 10 | Ethanol | 24.6 |
| 11 | Dimethyl sulfoxide | 46.7 |

Visual inspection alone cannot differentiate whether particles in a suspension are truly well dispersed, especially when the suspension becomes opaque with high loadings of particles. Since dispersions of colloidal materials are often used to create thin films by solution processing, the degree of homogeneity of the final thin film directly reflects the quality of the dispersion. In this regard, LB assembly was employed to create closely packed thin films of CNTs for evaluation by SEM. In LB assembly, the colloidal dispersions are first spread on water surface and then transferred onto a solid substrate to yield a colloidal monolayer. If the nanotubes are indeed well dispersed, they would form a monolayer-like LB film made of a nanotube network. If the nanotubes are not well dispersed, they would form a monolayer of distinctly visible aggregated nanotube islands in addition to some dispersed ones.

FIGS. 19A-19C are SEM images of LB films made from the m-cresol/MWCNTs dispersions immediately after being diluted by toluene and after 1 and 7 days, respectively. All of the images show a continuous monolayer-like network of MWCNTs (FIGS. 19A-19C). In contrast, for the m-cresol/MWCNT sample in acetone, the SEM images of its LB films show mostly clumps of aggregated nanotubes, starting from right after dilution (FIGS. 19D-19F). With a high dielectric constant of 21.0, acetone can destabilize the charge-transfer complex of m-cresol and nanotubes, leading to rapid aggregation of the MWCNTs.

Long Term Stability of Cresol-Nanotubes Complex in Compatible Solvents

It has now been established that compatible solvents that can stabilize a cresol-nanotube charge-transfer complex should be non-polar, miscible, and non-reactive with cresols. Polar, high dielectric constant solvents are incompatible with the cresol-nanotube dispersion. After 2 months, a m-cresol/MWCNTs dispersion was found to sediment in both compatible solvents (e.g., toluene) and incompatible solvents (e.g., acetone). However, the MWCNT sediment in 80 vol % of toluene can be readily re-dispersed by gentle agitation to produce a continuous and uniform LB monolayer of nanotubes. In contrast, the sediment in 80 vol % of acetone cannot be re-dispersed and is still made of aggregates. (FIGS. 20A and 20B) Being able to re-disperse sedimented nanotubes easily and on-demand is highly beneficial for practical applications, which is equally important to having a dispersion with long shelf life.

Diluting a nanotube dispersion in m-cresol with a compatible solvent reduces the viscosity and the time needed for drying the products, which are beneficial for fabricating thin films or coatings based on common solution-processing techniques such as air brushing. Here, SWCNTs were chosen as a model system for demonstration, since they exhibit more drastic morphological differences between the starting powders and the final coating. FIG. 21A is a SEM image of the starting SWCNT powders, showing heavily bundled nanotubes with widths of several microns to tens of microns. These powders can be readily dispersed in m-cresol by sonication or grinding to yield a thick dispersion. With m-cresol itself as the solvent, the SWCNT dispersions were usually too viscous for air brushing (FIG. 21B). If used at low loading levels, the deposited film was usually still wet after spraying, even on heated substrates, due to the slow evaporation speed of m-cresol. Adding toluene to m-cresol/SWCNT did not alter the colloidal stability of the nanotubes but greatly lowered the viscosity of the solvent and increased the drying speed, resulting in an ink readily usable for air brushing. The toluene-based ink was then sprayed onto different substrates such as cloth, paper, and copper foil placed on a hotplate pre-heated to 200° C. Uniform coating was achieved on all these substrates without a trace of the micron-scale ribbons observed in the starting SWCNT powders (FIGS. 21C-21H). SEM studies revealed that the SWCNT coatings are continuous, smooth, and uniform over both the porous and highly uneven substrates (e.g., FIG. 21C, cloth and FIG. 21E, paper) and the flat and impermeable surface (e.g. FIGS. 21G and 21H, copper foil). Notably, on cloth and paper, the SWCNT coating not only uniformly covered the fibers and replicated the textile morphologies, but also formed bridging films connecting the neighboring fibers (FIGS. 21D, 21F). These can only be achieved when the SWCNTs are well-dispersed in the ink.

The morphological uniformity of air-brushed SWCNT coatings leads to their uniform electrical conductivities for potential applications that need light weight, homogeneous, and highly conductive coatings. Sheet resistances of the SWCNT coatings on cloth and paper were measured using the 4-point probe method. The electrical homogeneity of SWCNT coatings on paper and cloth over an area of 9 cm×9 cm were mapped with a periodic displacement of 8 mm using a probe head equipped with a set of 4 equally spaced probes with end-to-end distance of around 6 mm. The average sheet resistivity for SWCNT coating on cotton cloth was measured to be 5.62 Ω/sq with a standard deviation of 0.86 Ω/sq from 72 measurements. The average sheet resistivity for SWCNT coated printer paper was measured to be 4.59 Ω/sq with a standard deviation of 0.64 Ω/sq from 72 measurements. These values led to coefficients of variation of 0.15 for the coated cloth and 0.14 for the coated paper, which was comparable to a commercial sample of graphite film with a coefficient of variation of 0.12. The low coefficient of variation indicated that the coatings had good homogeneities and could exhibit sufficiently predictable properties for applications.

CONCLUSION

Using cresols as a minority cosolvent, unfunctionalized CNTs can be dispersed in common organic solvents with low dielectric constants without the need for any dispersing agent. $^1$H-NMR, Raman, and Fourier transform infrared spectroscopy studies confirmed that cresol molecules form a charge-transfer complex with CNTs through their phenolic hydroxyl protons. $^1$H-NMR can also be used to identify solvents that are compatible with cresols to disperse CNTs, offering mechanistic insights when it is hard to evaluate colloidal dispersity based on visual inspection or microscopy. Non-polar solvents stabilize the cresol-nanotube complex and can be added to create nanotube formulations with desirable solvent properties for solution processing. Polar solvents screen the charge-transfer interaction and destabilize the complex, and they can be used to remove cresols after solution processing. As a proof of concept demonstration, SWCNTs dispersed in a blend of m-cresol and toluene or hexane were used directly for air brushing to create continuous and uniform coatings of nanotubes on various surfaces.

Example 3

Figure 22:
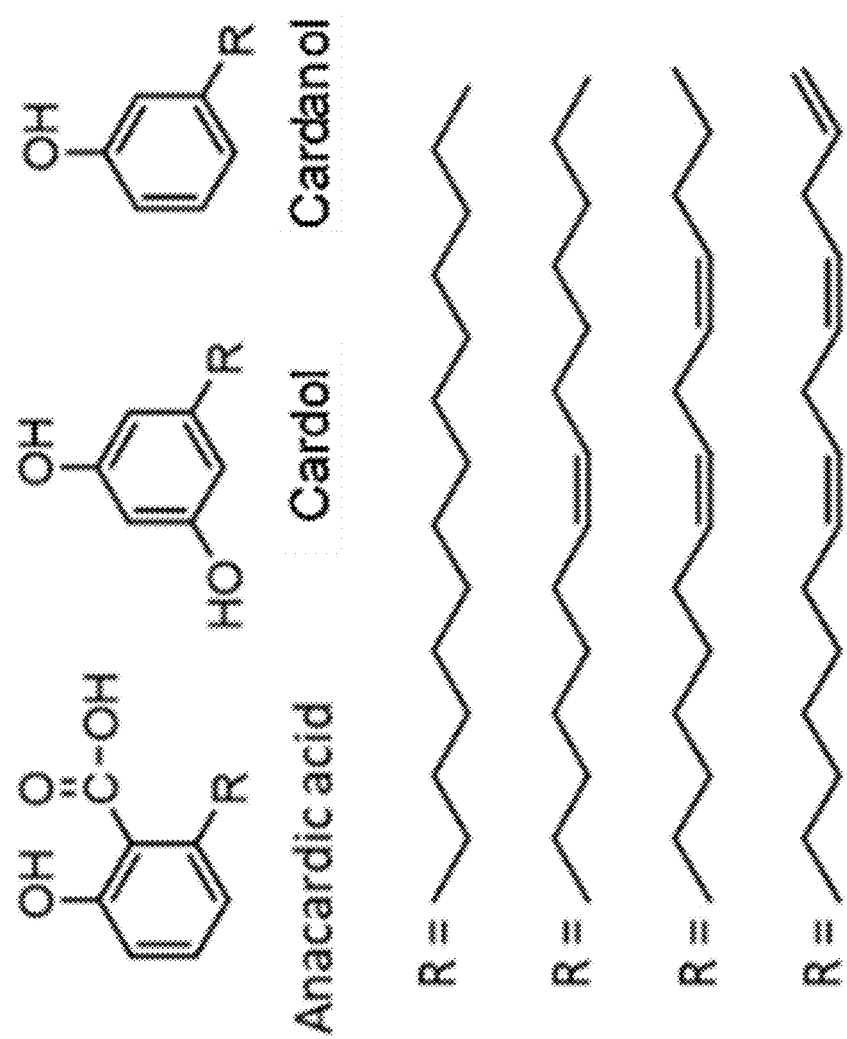
FIG. 22: Cashew nut shell liquid is a pale transparent liquid made of several different phenolic derivatives such as anacardic acid, cardanol, and cardol. MWCNTs can be directly dispersed in CNSL (0.5-2 mg/ml) without the need for additional surfactants or dispersing agents.

This example describes the direct, surfactant-free dispersion of CNTs in phenol-based plant oils. More specifically, this example demonstrates that cashew nut shell liquid (CNSL), a waste byproduct from production of cashew nuts, is a phenolic oil that can directly disperse CNT. The main components in CNSL are various phenolic compounds, as shown in FIG. 22. This discovery offers a green approach to processing CNTs.

Carbon nanotubes also can be dispersed in vanilla (a phenol-based oil) dissolved in castor oil (a non-phenolic solvent) (FIG. 23). Note that pure vanilla is a solid, but also disperses CNTs upon melting. This example shows that plant oil-CNT complexes are also compatible with low-dielectric-contrast solvents, such as castor oil.

Figure 24:
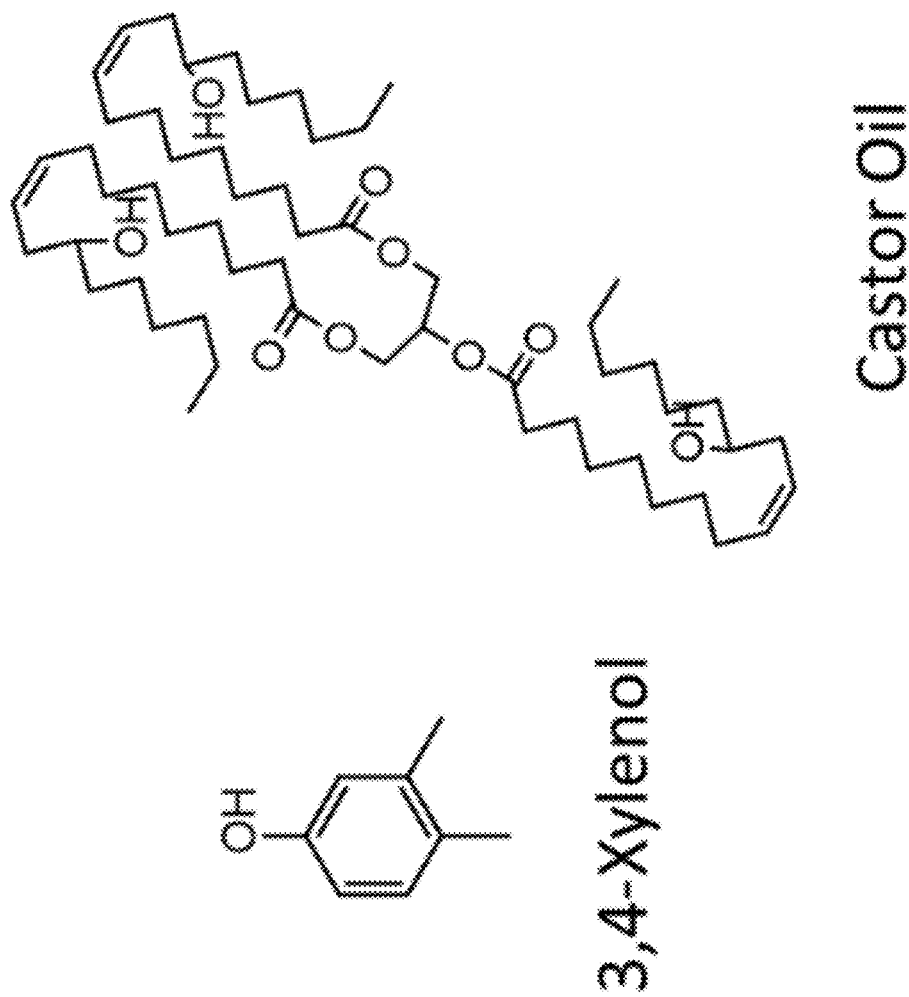
FIG. 24: A mixture of 20 wt. % 3,4-xylenol with 80 wt. % castor oil is a pale transparent liquid. MWCNTs can be directly dispersed in this solvent mixture (up to at least 1 mg/ml).

MWCNTs also can be directly dispersed in a mixture of 3,4-xylenol and castor oil (FIG. 24). This and the previous examples are used to show that plant oil based solvents can be formulated for MWCNTs, using either a synthetic phenolic compound (3,4-xylenol), or another natural plant oil (CNSL or vanillin).

The use of plant oil based solvents, either as-is or with a minority phenolic solvent, to disperse CNTs (and other carbon particles), has immediate applications for making high performance, sustainable lubricants. Many of these oils are already used as lubricants, and carbon additives are known to improve their performance in terms friction reduction and wear protection. The carbon particles can be dispersed without additional surfactants, which is a great advantage. The use of CNTs can also greatly improve the oils' thermal conductance, another highly desired property for lubricant oils.

Experimental Procedure

Materials

TNGM2 type MWCNTs were purchased from Timesnano under Chengdu Organic Chemicals Co. Ltd. Vanillin, 3,4-Xylenol, and castor oil were purchased from Sigma-Aldrich and used as is. Pure cashew nut shell liquid was purchased from Allin Exporters.

Dispersing CNT in Cashew Nut Shell Liquid 150 mg of MWCNT was mixed with 30 ml of CNSL and homogenized using a Qsonica Q125 sonicator rated at 125 W operating at 90% power for a total of 2 hours at 2 s/2 s on/off cycles. After the sonication, the dispersion was centrifuged at 11,000 rpm for 1 hour. After centrifugation, the supernatant was collected.

Dispersing CNT in 3,4-Xylenol and Castor Oil 6 g of 3,4-xylenol was dissolved into 24 g of castor oil. 150 mg of MWCNT was mixed into the castor oil solution and homogenized using a Qsonica Q125 sonicator rated at 125 W operating at 90% power for a total of 2 hours at 2 s/2 s on/off cycles. After the sonication, the dispersion was centrifuged at 11,000 rpm for 1 hour. After centrifugation, the supernatant was collected.

Dispersing CNT in Vanillin and Castor Oil 6 g of vanillin was dissolved into 24 g of castor oil. 150 mg of MWCNT was mixed into the castor oil solution and homogenized using a Qsonica Q125 sonicator rated at 125 W operating at 90% power for a total of 2 hours at 2 s/2 s on/off cycles. After the sonication, the dispersion was centrifuged at 11,000 rpm for 1 hour. After centrifugation, the supernatant was collected.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method of making a solid object from a composition comprising carbon particles dispersed in an organic solvent comprising one or more cresols and, optionally, one or more additional phenol group-containing molecules, wherein at least 90 wt. % of the composition consists of the carbon particles, the one or more cresols, and, if present, the one or more additional phenol group-containing molecules, and further wherein the composition has a viscosity greater than 1000 Pa*S at 298K, the method comprising;

forming the composition into a shape; and removing the organic solvent from the composition to form the solid object that retains said shape.

2. The method of claim 1, wherein the carbon particles are carbon nanotubes.

3. The method of claim 2, wherein the composition is electrically conducting, having a conductance of at least $10^{-3}$ S.

4. The method of claim 2, wherein the composition has a carbon nanotube concentration of at least 40 mg/ml and a viscosity of at least 1200 Pa*S at 298 K.

5. The method of claim 2, wherein forming the composition into a shape comprises extruding the composition into a fiber, and removing the organic solvent from the composition comprises removing the organic solvent from the extruded fiber.

6. The method of claim 1, wherein forming the composition into a shape comprises extruding the composition into a fiber, and removing the organic solvent from the composition comprises removing the organic solvent from the extruded fiber.

7. The method of claim 2, wherein the composition has a carbon nanotube concentration of at least 60 mg/ml and a compression modulus of at least 0.125 kPa.

8. The method of claim 2, wherein the composition has a carbon nanotube concentration of at least 100 mg/ml.

9. The method of claim 7, wherein forming the composition into a shape comprises placing the composition into a mold to form a molded composition and removing the organic solvent from the composition comprises removing the organic solvent from the molded composition.

10. The method of claim 1, wherein forming the composition into a shape comprises placing the composition into a mold to form a molded composition and removing the organic solvent from the composition comprises removing the organic solvent from the molded composition.

11. The method of claim 1, wherein the one or more additional phenol group-containing molecules are not included in the composition.

12. The method of claim 1, comprising the one or more additional phenol group-containing molecules.

13. The method of claim 12, wherein the one or more additional phenol group-containing molecules comprise bisphenol-A, bisphenol-S, bisphenol-AF, bisphenol-F, bisphenol-M, bisphenol B, bisphenol C, phloroglucinol, resorcinol, 4-chloro-3-methylphenol, naphthol isomers, naphthlenediol isomers, naphthlenetriol isomers, xylenols, or a combination of two or more thereof.

14. The method of claim 1, wherein the solid object has at least one dimension of at least one centimeter.

15. The method of claim 1, wherein at least 99 wt. % of the composition consists of the carbon particles, the one or more cresols, and, if present, the one or more additional phenol group-containing molecules.

16. The method of claim 1, wherein the composition consists of the carbon particles, the one or more cresols, and, if present, the one or more additional phenol group-containing molecules.

17. The method of claim 1, wherein the composition is free of polymers and polymer precursors.

18. A method of making a solid object, the method comprising:

forming a paste comprising carbon particles dispersed in an organic solvent comprising one or more cresols and, optionally, one or more additional phenol group-containing molecules, wherein at least 90 wt. % of the composition consists of the carbon particles, the one or more cresols, and, if present, the one or more additional phenol group-containing molecules and the composition has a carbon particle concentration of at least 3 mg/ml;

mixing solid particles of a polymer with the paste; and removing the organic solvent from the mixture to form the solid object.

19. The method of claim 1, wherein the polymer comprises poly(methyl methacrylate), a nylon, polyethylene terephthalate, polystyrene, or a phenolic resin.

20. The method of claim 18, wherein the carbon particles are carbon nanotubes.

* * * * *